US008526287B2

United States Patent
Kondo et al.

(10) Patent No.: US 8,526,287 B2
(45) Date of Patent: Sep. 3, 2013

(54) OPTICAL DISK APPARATUS

(75) Inventors: Kenji Kondo, Osaka (JP); Kenji Fujiune, Osaka (JP); Takeharu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/637,520

(22) PCT Filed: Nov. 9, 2011

(86) PCT No.: PCT/JP2011/006265
§ 371 (c)(1),
(2), (4) Date: Sep. 26, 2012

(87) PCT Pub. No.: WO2012/063485
PCT Pub. Date: May 18, 2012

(65) Prior Publication Data
US 2013/0016594 A1    Jan. 17, 2013

(30) Foreign Application Priority Data
Nov. 10, 2010    (JP) .................................. 2010-251465

(51) Int. Cl.
*G11B 7/00* (2006.01)
(52) U.S. Cl.
USPC ................ 369/112.23; 369/13.33; 369/44.41; 369/53.23; 369/53.28
(58) Field of Classification Search
USPC ................. 369/47.15, 112.01, 112.23, 13.33, 369/53.23, 53.28, 44.41
See application file for complete search history.

(56) References Cited

U.S. PATENT DOCUMENTS

| 6,154,326 | A  | * | 11/2000 | Ueyanagi et al. ............. 359/819 |
| 7,236,443 | B2 | * | 6/2007 | Martynov et al. ........ 369/112.01 |
| 7,342,869 | B2 | * | 3/2008 | Mizuno .................... 369/112.24 |
| 8,031,575 | B2 |   | 10/2011 | Nakaoki et al. |
| 8,159,909 | B2 |   | 4/2012 | Nakao |
| 2004/0047271 | A1 |   | 3/2004 | Mizuno |

(Continued)

FOREIGN PATENT DOCUMENTS

| JP | 2004-79049 | 3/2004 |
| JP | 2005-346882 | 12/2005 |

(Continued)

OTHER PUBLICATIONS

International Search Report issued Feb. 7, 2012 in International (PCT) Application No. PCT/JP2011/006265.

*Primary Examiner* — Thomas Alunkal
(74) *Attorney, Agent, or Firm* — Wenderoth, Lind & Ponack, L.L.P.

(57) ABSTRACT

Provided is an optical disk apparatus capable achieving stable focus control or tracking control. A first detector receives reflected light from an object lens optical system, a second detector receives reflected light from a prescribed information layer, a positional deviation determination unit determines positional deviation between a focal point of a light beam and a point where information on the prescribed information layer is recorded or reproduced, on the basis of a signal from the second detector, a stray light determination unit determines a surface stray light component which is reflected light from the surface of an optical disk and is included in the signal from the positional deviation determination unit, on the basis of the signal from the first detector, and a stray light correction unit corrects the signal output from the positional deviation determination unit on the basis of the surface stray light component thus determined.

9 Claims, 17 Drawing Sheets

(56) References Cited

U.S. PATENT DOCUMENTS

| | | | |
|---|---|---|---|
| 2004/0125713 A1* | 7/2004 | Takahashi et al. | 369/44.34 |
| 2005/0286360 A1 | 12/2005 | Nakao | |
| 2007/0008853 A1* | 1/2007 | Nakao et al. | 369/53.22 |
| 2007/0217300 A1 | 9/2007 | Koyama et al. | |
| 2009/0201777 A1* | 8/2009 | Ohta | 369/44.32 |
| 2009/0219799 A1 | 9/2009 | Nakaoki et al. | |
| 2011/0044152 A1* | 2/2011 | Nemoto et al. | 369/112.03 |

FOREIGN PATENT DOCUMENTS

| | | |
|---|---|---|
| JP | 2007-250073 | 9/2007 |
| JP | 2009-123286 | 6/2009 |
| JP | 2010-33688 | 2/2010 |

* cited by examiner

OPTICAL DISK APPARATUS

TECHNICAL FIELD

The present invention relates to an optical disk apparatus which reproduces information on an optical disk (including various optical disks, such as read-only or recordable and readable disks) using near-field light generated from a light beam from a light source such as a laser, or which records information on an optical disk, and in particular to an optical disk apparatus which corrects stray light on an optical disk having a cover layer.

BACKGROUND ART

Conventionally, an optical disk such as a CD, DVD or BD (Blu-ray disc) is used widely for recording and reproducing video image signals and sound signals. In an optical disk apparatus which records or reproduces information to and from an optical disk, processing for reading out information that has been written to an information layer of an optical disk is carried out by scanning very fine tracks by means of a very small optical beam spot which has been made to converge on the information layer by an optical pickup. In this case, in reading out the information written on an optical disk accurately and continuously, servo technology for causing the optical beam spot to follow a track is indispensable.

Consequently, in an optical disk apparatus, focus control is generally carried out to cause an optical beam spot to follow an information layer on an optical disk on the basis of a focus error signal (hereinafter called "FE signal") which represents positional deviation between the optical beam spot and the information layer. In addition, tracking control is carried out to cause the optical beam spot to follow a track on the basis of a tracking error signal (hereinafter called "TE signal") which represents positional deviation between the optical beam spot and the center of the track.

Furthermore, even if the reflectivity of the optical disk varies or the light beam irradiation power varies during recording or reproduction, generally, the determination gain of the FE signal and the TE signal are kept uniform by an AGC (Automatic Gain Control) circuit which normalizes the FE signal and the TE signal by the quantity of the returned light. As a result of this, it is possible to achieve stabilized focus control and tracking control.

Therefore, when recording or reproducing information to or from an optical disk having a cover layer and a plurality of information layers, in an optical disk apparatus of this kind, the following issues arise.

For example, in an optical disk having a cover layer and a plurality of information layers, when a light beam is irradiated onto a prescribed information layer in order to reproduce information, the returned light of the determined light beam includes reflected light from the surface of the optical disk and other information layers (other layer stray light), as well as reflected light from the prescribed information layer. Consequently, the amount of returned light determined is the sum of the reflected light from the prescribed information layer and other layer stray light, and the amount of returned light cannot be determined accurately. Here, if the optical disk has a cover layer and one information layer, then the other layer stray light is reflected light from the surface of the cover layer (the surface of the optical disk), and the amount of reflected light from the surface of the cover layer depends on the surface reflectivity and the thickness of the cover layer. In other words, the reflected light becomes greater, the higher the surface reflectivity, and the reflected light becomes greater, the smaller the thickness of the cover layer.

As a result of this, normalization for correcting variation in the reflectivity in the prescribed information layer of the optical disk and normalization for correcting variation in the light beam irradiation power during recording or reproduction are not carried out correctly in the AGC circuit, and an FE signal and a TE signal having a suitable determination gain are not obtained. Consequently, the reflected light from the surface of the cover layer leads to destabilization of the focus control and tracking control, and gives rise to decline in the recording characteristics and reproduction characteristics of the optical disk apparatus.

In order to solve problems of this kind, an optical pick-up has been proposed which corrects the amount of returned light and generates an error signal having reduced effects of other layer stray light, by providing a dedicated detector for determining the other layer stray light, subtracting the determined amount of light for the other layer stray light from the determined amount of light for the returned light and using the resulting amount in the AGC circuit (see, for example, Patent Literature 1).

On the other hand, in recent years, methods and apparatuses which achieve further increase in capacity of optical disks have been developed. In an optical disk apparatus, the information recording density depends on the size of the light beam spot which converges on the recording medium. Therefore, increased capacity of an optical disk can be achieved by reducing the size of the light spot which is irradiated by the optical pick-up.

The size of the light spot is proportional to the numerical aperture of the object lens and inversely proportional to the wavelength of the irradiated light. Therefore, in order to obtain a smaller light spot, either the wavelength of the light used should be made shorter or the numerical aperture of the object lens should be made greater. However, in optical information recording and reproduction apparatuses which have been developed for practical use thus far, the interval between the optical disk and the object lens differs from the light wavelength by a sufficiently large amount, and when the numerical aperture of the object lens exceeds 1, the light emitted from the object lens is fully reflected by the emission surface of the lens and therefore it has not been possible to raise the recording density.

Therefore, as an optical recording and reproduction method using an object lens having a numerical aperture exceeding 1, a near-field optical recording and reproduction method using a SIL (Solid Immersion Lens) has been developed. The numerical aperture NA is expressed by NA=n·sin θ, taking the refractive index of the medium to be n and taking the maximum angle with respect to the optical axis of the light beam in the medium to be θ. Normally, when the numerical aperture is greater than 1, the angle θ becomes equal to or greater than the critical angle, and therefore the light in this region is fully reflected at the emission end face of the object lens. This fully reflected light spills out from the emission end surface as evanescent light. In a near-field optical recording and reproduction method, it is possible to transmit this evanescent light to the optical disk from the lens. Therefore, the interval between the emission end face of the object lens and the surface of the optical disk (the air gap) is kept at a distance which is no more than ¼ of the wavelength of the optical beam, in other words, a distance which is shorter than the attenuation distance of the evanescent light, and hence light in a range where the numerical aperture exceeds 1 is transmitted through the optical disk from the object lens.

In an optical disk apparatus which uses a SIL in this way, conventionally, a composition is adopted in which information is recorded or reproduced to and from an optical disk having an information layer provided on the surface thereof. However, from the viewpoint of protecting the information layer, a desirable composition is one which records or reproduces information to and from an optical disk provided with a cover layer, as in existing optical disks.

If information is recorded to or reproduced from an optical disk having a cover layer in an optical disk apparatus using a SIL, the following issues arise.

FIG. 17 is a diagram showing a relationship between a near-field air gap and the level of surface reflected light, in a conventional optical disk apparatus. In FIG. 17, the horizontal axis Gap is the air gap and the vertical axis Ref is the reflectivity. Here, the reflectivity indicates the ratio of surface reflected light with respect to the amount of light in the light beam which is incident on the object lens.

As shown in FIG. 17, when the wavelength of the optical beam is 405 nm, then in the region where the air gap is approximately 100 nm or less, the surface reflectivity varies dramatically in accordance with the air gap and the surface reflectivity reaches a maximum of approximately 37%. On the other hand, in an existing optical disk apparatus, the surface reflectivity is around 8% and is uniform, regardless of the air gap.

Moreover, in an optical disk apparatus using a SIL, it is necessary for the cover layer of the optical disk to have a thickness of several μm approximately. On the other hand, in an existing optical disk apparatus, the cover layer of a BD which has the thinnest cover layer has a thickness of 100 μm.

From the foregoing, in the case of an optical disk apparatus using a SIL, the effects of the surface stray light (surface reflected light) are large compared to an existing optical disk apparatus, in other words, an optical disk apparatus using a far-field optical recording and reproduction method. For instance, in the case of an optical disk apparatus in which the numerical aperture is 1.78, the refractive index n of the SIL and the cover layer is 2, and the thickness of the cover layer is approximately 1.2 μm, the ratio between the reflected light from the information layer and the stray light from the surface of the cover layer reaches a value of around 2:1. Therefore, the effects of the stray light from the surface of the cover layer are extremely large.

However, the prior art does not disclose a method for determining surface stray light in an optical disk apparatus using a SIL.

CITATION LIST

Patent Literature

Patent Literature 1: Japanese Patent Application Publication No. 2005-346882

SUMMARY OF INVENTION

The present invention was devised in view of the problems described above, an object thereof being to provide an optical disk apparatus capable of achieving stable focus control or tracking control.

The optical disk apparatus relating to one aspect of the present invention includes: a light source which emits a light beam; a condensing optical system which is arranged in the vicinity of a surface of an information carrier and which condenses near-field light generated from a light beam emitted from the light source, onto the information carrier; a focusing unit which focuses the light beam on a prescribed information layer of the information carrier; a first light receiving unit which receives reflected light that has been reflected by an emission end face of the condensing optical system; a gap control unit which controls a distance between the condensing optical system and the surface of the information carrier, on the basis of a signal from the first light receiving unit; a second light receiving unit which receives reflected light from the prescribed information layer, in a plurality of divided light receiving regions; a positional deviation determination unit which determines positional deviation between a focal point of the light beam and a point where information on the prescribed information layer is recorded or reproduced, on the basis of a signal from the second light receiving unit; and a stray light determination unit which determines a surface stray light component which is reflected light from the surface of the information carrier and which is included in a signal from the positional deviation determination unit, on the basis of the signal from the first light receiving unit, wherein the positional deviation determination unit includes a stray light correction unit which corrects a signal output from the positional deviation determination unit on the basis of the surface stray light component determined by the stray light determination unit.

According to this composition, the light source emits a light beam. The condensing optical system is arranged in the vicinity of a surface of an information carrier and condenses near-field light generated from a light beam emitted from the light source, onto the information carrier. The focusing unit focuses the light beam on a prescribed information layer of the information carrier. The first light receiving unit receives reflected light reflected by the emission end face of the condensing optical system. The gap control unit controls a distance between the condensing optical system and the surface of the information carrier, on the basis of a signal from the first light receiving unit. The second light receiving unit receives reflected light from the prescribed information layer in a plurality of divided light receiving regions. The positional deviation determination unit determines positional deviation between a focal point of the light beam and a point where information on the prescribed information layer is recorded or reproduced, on the basis of a signal from the second light receiving unit. The stray light determination unit determines a surface stray light component which is reflected light from a surface of the information carrier and which is included in a signal from the positional deviation determination unit, on the basis of a signal from the first light receiving unit. The stray light determination unit determines the surface stray light component, on the basis of the signal from the first light receiving unit. The stray light correction unit of the positional deviation determination unit corrects the signal output from the positional deviation determination unit on the basis of the surface stray light component determined by the stray light determination unit.

According to the present invention, since the signal output from the positional deviation determination unit is corrected on the basis of the surface stray light component and this corrected signal is used to control the positioning of the focal point of the light bean and the point where information is recorded or reproduced on the prescribed information layer, then the determination gain is kept uniform even if there is variation in the reflectivity of the information layer or the optical beam irradiation power during recording or reproduction, and stable focus control or tracking control can be achieved.

The objects, characteristics and advantages of the present invention will become more apparent from the following detailed description and accompanying drawings.

DESCRIPTION OF EMBODIMENTS

Below, an embodiment of the present invention is described with reference to the drawings. The embodiment described below is one example of a concrete embodiment of the present invention, and is not intended to limit the technical scope of the present invention.

(First Embodiment)

Figure 1:
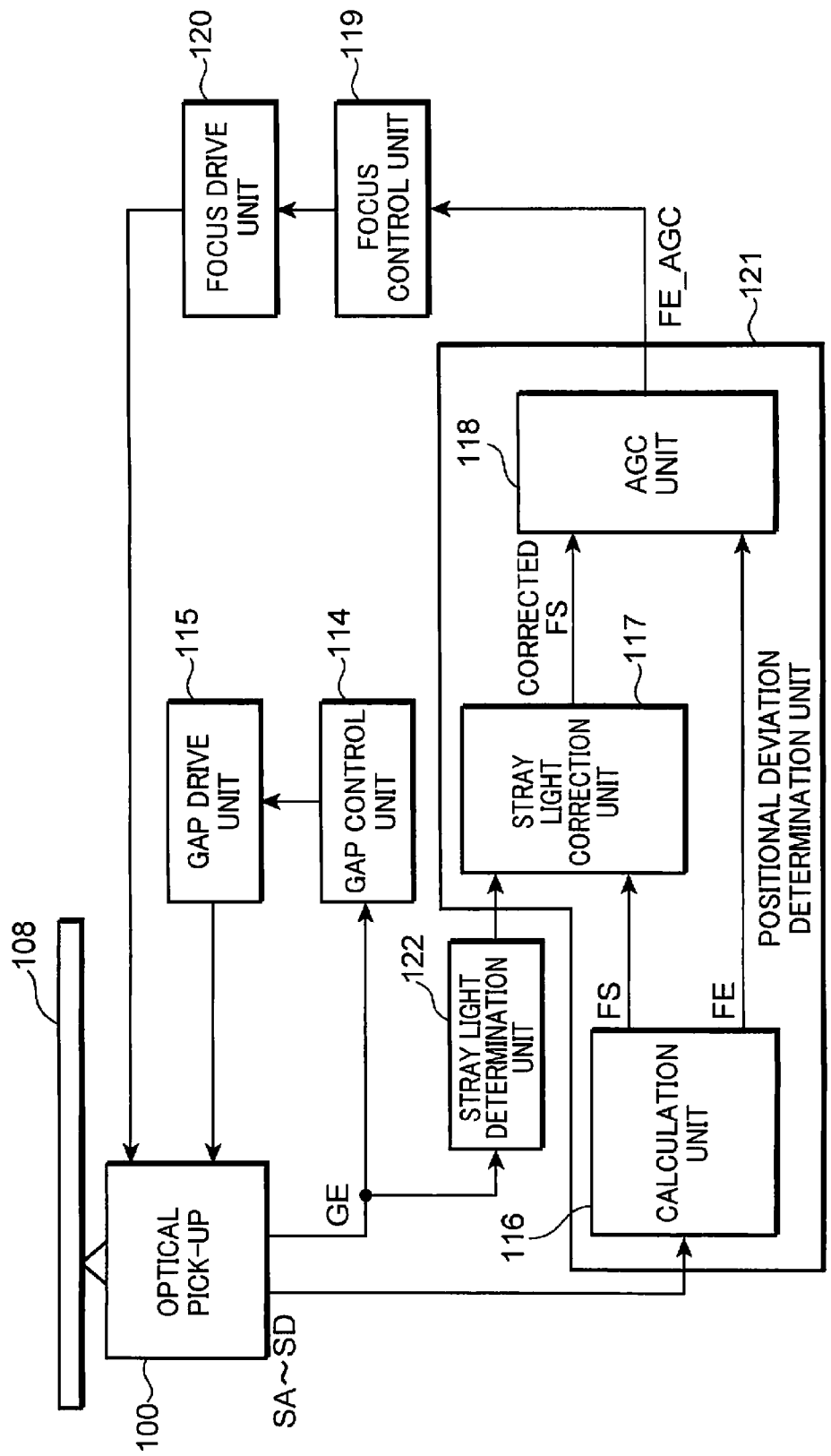
FIG. 1 is a block diagram showing a composition of an optical disk apparatus according to a modification of a first embodiment of the invention.
Figure 2:
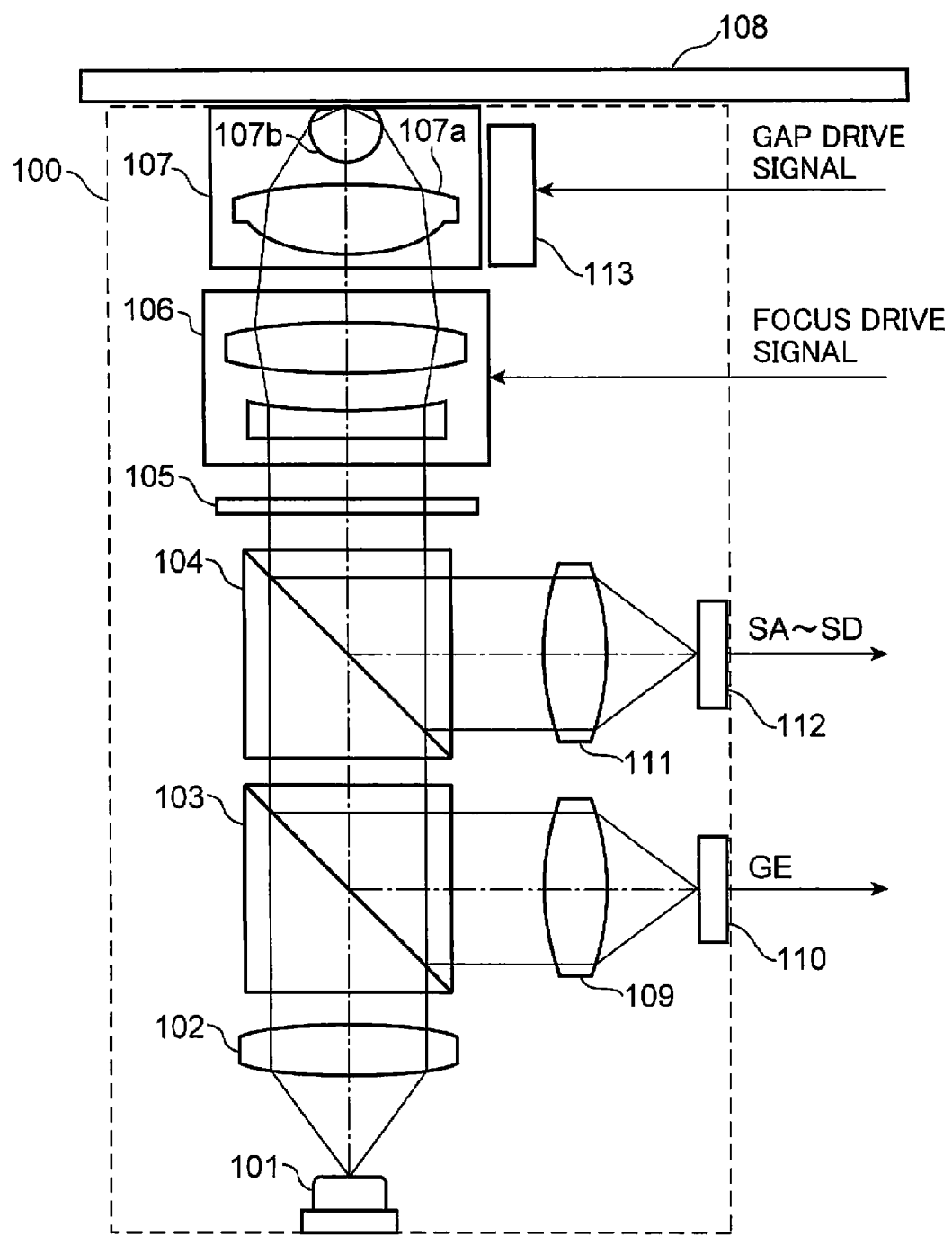
FIG. 2 is a block diagram showing a composition of the optical pick-up in FIG. 1.
Figure 3:
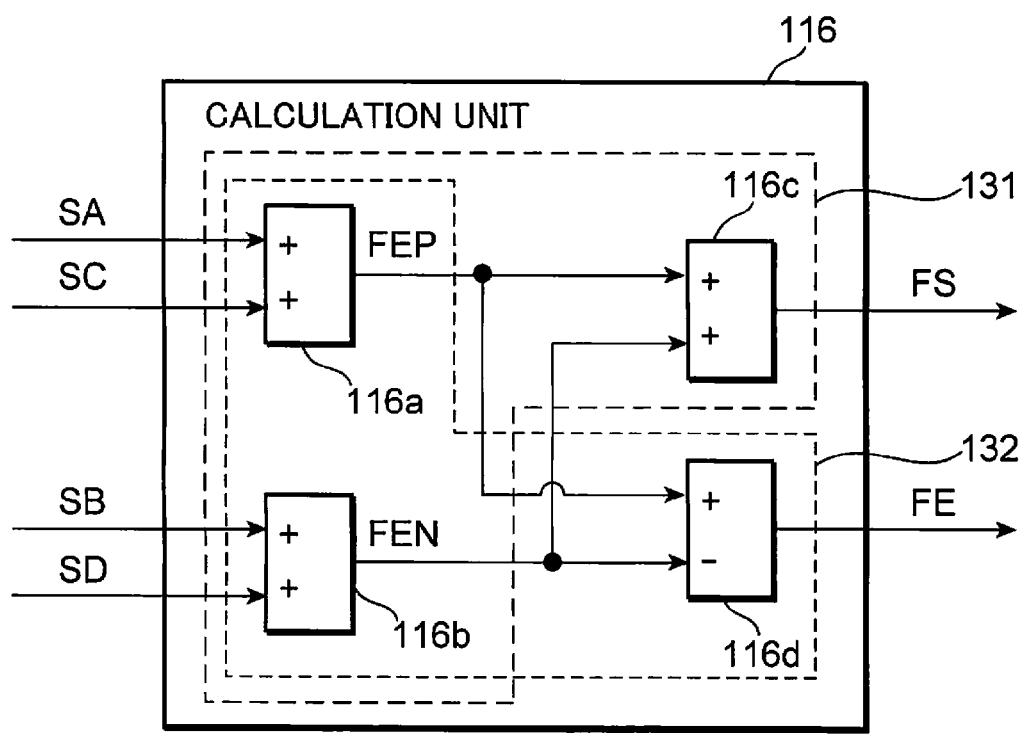
FIG. 3 is a block diagram showing a composition of the calculation unit in FIG. 1.
Figure 4:
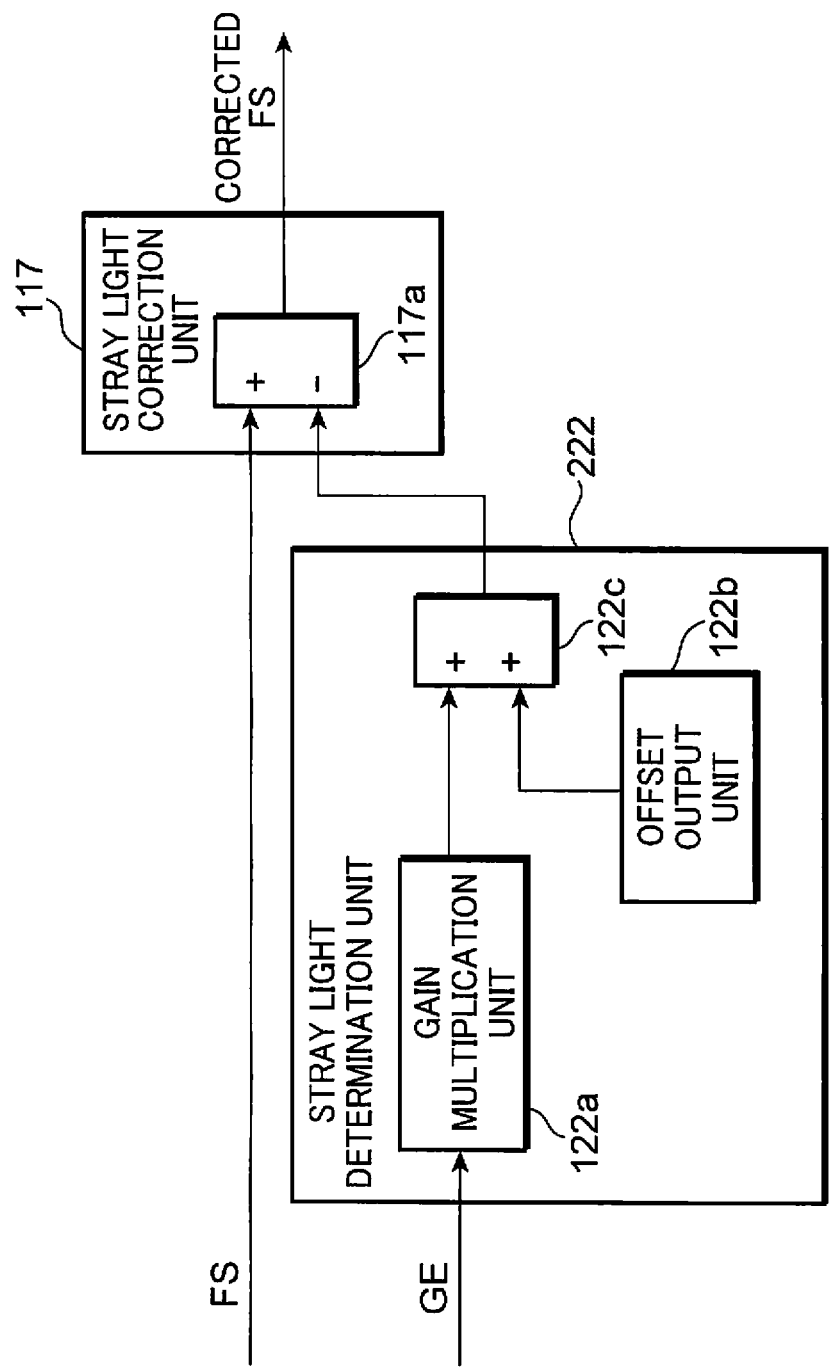
FIG. 4 is a block diagram showing a composition of the stray light determination unit and the stray light correction unit in FIG. 1.

FIG. 1 is a block diagram showing a composition of an optical disk apparatus according to a first embodiment of the invention. FIG. 2 is a block diagram showing a composition of the optical pick-up 100 in FIG. 1. FIG. 3 is a block diagram showing a composition of a calculation unit 116 in FIG. 1. FIG. 4 is a block diagram showing a composition of a stray light determination unit 122 and a stray light correction unit 117 in FIG. 1.

As shown in FIG. 1, the optical disk apparatus according to the first embodiment includes: an optical pick-up 100, a gap control unit 114, a gap drive unit 115, a positional deviation determination unit 121, a stray light determination unit 122, a focus control unit 119 and a focus drive unit 120. The positional deviation determination unit 121 includes a calculation unit 116, a stray light correction unit 117, and an AGC (Automatic Gain Control) unit 118.

As shown in FIG. 2, the optical pick-up 100 according to the first embodiment includes: a light source 101, a collimating lens 102, a beam splitter 103, a polarizing beam splitter 104, a ¼ wavelength plate 105, a beam expander 106, an object lens optical system 107, a first determination lens 109, a first detector 110, a second determination lens 111, a second detector 112 and a gap actuator 113.

Furthermore, the object lens optical system 107 includes a lens 107a and a SIL (Solid Immersion Lens) 107b.

Moreover, as shown in FIG. 3, the calculation unit 116 includes an adder 116a, an adder 116b, an adder 116c and a subtractor 116d. The addition unit 131 is constituted by an adder 116a, an adder 116b and an adder 116c. The positional deviation signal generation unit 132 is constituted by an adder 116a, an adder 116b and a subtractor 116d.

Furthermore, as shown in FIG. 4, the stray light determination unit 122 includes a gain multiplier unit 122a, an offset output unit 122b, and an adder 122c, and the stray light correction unit 117 includes an adder 117a.

The light source 101 emits a light beam. The object lens optical system 107 is arranged in proximity to the surface of the optical disk 108, and condenses near-field light generated from a light beam emitted from the light source 101, onto the optical disk 108. The beam expander 106 focuses the light beam on a prescribed information layer of the optical disk 108. The first detector 110 receives reflected light which has been reflected by the emission end face of the object lens optical system 107. The second detector 112 receives reflected light from the prescribed information layer of the optical disk 108 in a plurality of divided light receiving regions.

The gap control unit 114 controls the distance between the object lens optics system 107 and the surface of the optical disk 108, on the basis of a signal from the first detector 110. The positional deviation determination unit 121 determines positional deviation between the focal point of the light beam and the position where information is recorded or reproduced on the prescribed information layer, on the basis of a signal from the second detector 112.

The stray light determination unit 122 determines the surface stray light component which is reflected light from the surface of the optical disk 108 and is included in the signal from the positional deviation determination unit 121, on the basis of the signal from the first detector 110.

The stray light correction unit 117 corrects the signal output from the positional deviation determination unit 121 on the basis of the surface stray light component determined by the stray light determination unit 122.

The calculation unit 116 carries out calculation processing on the plurality of signals which are output from the second detector 112. The addition unit 131 adds up the plurality of signals from the second detector 112. The positional deviation signal generation unit 132 generates a focusing direction positional deviation signal (focus error signal) or a tracking direction positional deviation signal (tracking error signal) by calculating a plurality of signals from the second detector 112. The AGC unit 118 generates a normalized signal by dividing the focusing direction positional deviation signal or the tracking direction positional deviation signal from the positional deviation signal generation unit 132 by the signal from the stray light correction unit 117. Furthermore, the stray light correction unit 117 corrects the signal from the addition unit 131 on the basis of the surface stray light component determined by the stray light determination unit 122 and outputs the corrected signal to the AGC unit 118.

In the first embodiment, the object lens optical system 107 corresponds to one example of a condensing optical system, the beam expander 106 corresponds to one example of a focusing unit, the first detector 110 corresponds to one example of a first light receiving unit, the gap control unit 114 corresponds to one example of a gap control unit, the second detector 112 corresponds to one example of a second light receiving unit, the positional deviation determination unit 121 corresponds to one example of a positional deviation determination unit, the stray light determination unit 122 corresponds to one example of a stray light determination unit, the stray light correction unit 117 corresponds to one example of a stray light correction unit, the addition unit 131 corresponds to one example of an adder, the positional deviation signal generation unit 132 corresponds to one example of a positional deviation signal generation unit, the AGC unit 118 corresponds to one example of a normalization unit, and the optical disk 108 corresponds to one example of an information carrier.

The operation of an optical disk apparatus which is composed as described above will now be explained.

The light beam of linear polarized light emitted from the light source 101 is incident on the collimating lens 102 and is converted into parallel light by the collimating lens 102. The light beam converted to parallel light by the collimating lens 102 is transmitted by the beam splitter 103 and the polarizing beam splitter 104 and is incident on the ¼ wavelength plate 105. The light beam of the linear polarized light which is incident on the ¼ wavelength plate is converted into a beam of circular polarized light. The light beam which is converted into circular converted light by the ¼ wavelength plate 105 is incident on the beam expander 106. The light beam incident on the beam expander 106 becomes parallel light, or slightly diverging light or converging light. The light beam which has been converted into parallel light or slightly diverging light or converging light by the beam expander 106 is incident on the object lens optical system 107.

Here, the object lens optical system 107 includes a lens 107a and a SIL 107b. Light propagation by evanescent light is performed by making the air gap present between the emission end face of the SIL 107b and the surface of the optical disk 108 opposing the emission end face shorter than the evanescent attenuation length which is a shorter distance than the wavelength of the light beam. Consequently, of the light beam which is incident on the object lens optical system 107, light at or below the critical angle is propagated normally to the optical disk 108 and light at or above the critical angle is propagated as evanescent light to the optical disk 108. The light beam propagated to the optical disk 108 is transmitted through the cover layer of the optical disk 108 and converges on the information layer.

The light beam which converges on the information layer of the optical disk 108 is reflected or diffracted by the information layer, and passes through the object lens optical system 107, the beam expander 106 and the ¼ wavelength plate 105 and becomes incident on the polarizing beam splitter 104. Of the light beam which is incident on the polarizing beam splitter 104, the component having a plane of polarization parallel to the light beam emitted from the light source 101 is transmitted and the component having a plane of polarization perpendicular to the light beam emitted from the light source 101 is reflected.

The light beam which has been transmitted through the polarizing beam splitter 104 is reflected by the beam splitter 103, converted into converging light by the first determination lens 109 and received by the first detector 110. The first detector 110 converts the received light beam into an electrical signal, generates a gap signal (hereinafter called "GE signal") indicating an air gap which is the interval between the emission end face of the SIL 107b and the surface of the optical disk 108, and outputs this signal to the gap control unit 114 and the stray light determination unit 122.

The gap control unit 114 is constituted by a phase compensating circuit and a low-band compensating circuit composed by digital filters based on a digital signal processor (called a DSP below), for example, and the gap control unit 114 performs phase compensation processing and low-band compensation processing on the input GE signal and then outputs the processed signal as a gap drive signal to the gap drive unit 115. The gap drive unit 115 amplifies the input gap drive signal and outputs this signal to the gap actuator 113. The gap actuator 113 moves the object lens optical system 107 in accordance with the gap drive signal.

By means of the operations described above, gap control is achieved to implement control using the GE signal so that the air gap between the emission end face of the SIL 107b in the object lens optical system 107 and the surface of the optical disk 108 is kept uniform.

On the other hand, the light beam which is reflected by the polarizing beam splitter 104 is converted into converging light by the second determination lens 111 while simultaneously being imparted with spherical aberration, and is received by the second detector 112.

Figure 5:
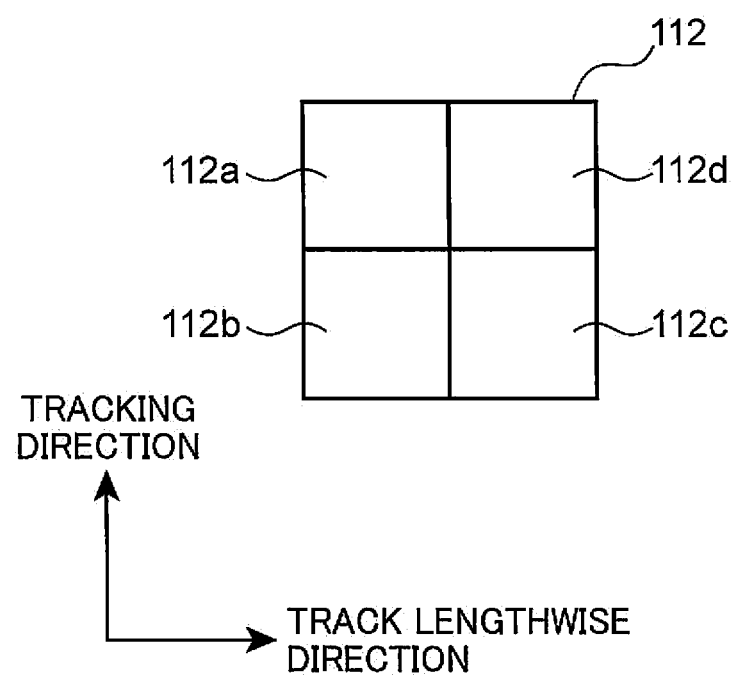
FIG. 5 is a plan diagram showing a composition of the second detector according to a first embodiment of the present invention.

Here, FIG. 5 shows a plan diagram of the second detector 112. FIG. 5 is a plan diagram showing a composition of the second detector 112 according to a first embodiment of the present invention. In FIG. 5, the up/down direction in the plane of the drawing is the radial direction of the optical disk 108 (called the tracking direction below), and the left/right direction in the plane of the drawing is the track lengthwise direction. As shown in FIG. 5, the second detector 112 is divided into four parts to create four light receiving regions 112a, 112b, 112c, 112d. The light receiving regions 112a, 112b, 112c, 112d respectively output signals SA, SB, SC, SD.

The second detector 112 converts a received light beam into an electrical signal and outputs signals SA to SD to the calculation unit 116. The adder 116a in the calculation unit 116 generates a signal FEP by adding the input signal SA to the input signal SC, and outputs this signal FEP to the adder 116c and the subtractor 116d. The adder 116b in the calculation unit 116 generates a signal FEN by adding the input signal SB to the input signal SD, and outputs this signal FEN to the adder 116c and the subtractor 116d. The adder 116c generates a focus sum signal (hereinafter, called "FS signal") which indicates the amount of returned light from the optical disk 108 by adding together the input signal FEP and the input signal FEN, and outputs this FS signal to the stray light correction unit 117. The adder 116d generates an FE signal (focus error signal) indicating a positional relationship between the information layer and the light beam spot on the information layer of the optical disk 108, by subtracting the input signal FEN from the input signal FEP, and outputs the FE signal to the AGC unit 118.

The gain multiplication unit 122a in the stray light determination unit 122 multiplies the input GE signal by a prescribed gain value and outputs the signal to the adder 122c. The offset output unit 122b outputs the prescribed offset value to the adder 122c. The adder 122c generates a stray light signal, which is a stray light component (surface stray light component) included in the FS signal, by adding the output signal input from the gain multiplication unit 122a, and the output signal input from the offset output unit 122b, and outputs the generated stray light signal to the subtractor 117a in the stray light correction unit 117. The subtractor 117a generates a corrected FS signal, which is an FS signal excluding the stray light component, by subtracting the input stray light signal from the input FS signal, and outputs the corrected FS signal to the AGC unit 118.

The AGC unit 118 generates an FE_AGC signal in which the FE signal is normalized in accordance with the amount of returned light of the light beam from the information layer of the optical disk 108, by dividing the input FE signal by the input corrected FS signal, and outputs this FE_AGC signal to the focus control unit 119. The focus control unit 119 is constituted by a phase compensating circuit and a low-band compensating circuit which are composed by digital filters based on a DSP, for example, similarly to the gap control unit 114, and applies phase compensation processing and low-band compensation processing to the input FE_AGC signal and outputs the resulting signal to the focus drive unit 120 as a focus drive signal. The focus drive unit 120 amplifies the input focus drive signal and outputs the signal to the beam expander 106. The beam expander 106 moves in the light axis direction in accordance with the focus drive signal.

By means of the operations described above, focus control is achieved to implement control so that the focal point of the light beam is positioned accurately on the information layer of the optical disk 108, on the basis of the FE_AGC signal which has been normalized by using the corrected FS signal from which the stray light component has been excluded.

As described above, the stray light determination unit 122 according to the first embodiment determines a stray light component included in a signal from the positional deviation determination unit 121 (FS signal) on the basis of a signal from the first detector 110 (GE signal). Furthermore, the stray light correction unit 117 according to the first embodiment corrects the FS signal by excluding the stray light component from the FS signal on the basis of the signal from the stray light determination unit 122.

Moreover, the addition unit 131 according to the first embodiment (the adder 116a, the adder 116b and the adder 116c) adds up the plurality of signals SA, SB, SC, SD from the second detector 112. Furthermore, the positional deviation determination unit 121 according to the first embodiment includes a positional deviation signal generation unit 132 which generates a focusing direction positional deviation signal (FE signal) or a tracking direction positional deviation signal by calculating the plurality of signals SA, SB, SC, SD from the second detector 112. In the first embodiment, the positional deviation signal generation unit 132 generates a focusing direction positional deviation signal (FE signal), but the present invention is not limited in particular to this and it is also possible to generate a tracking direction positional deviation signal (TE signal).

Furthermore, the AGC unit 118 according to the first embodiment generates a normalized signal (FE_AGC signal) by dividing the signal (FE signal) from the positional deviation signal generation unit 132 by the signal (corrected FS signal) from the stray light correction unit 117. Moreover, the stray light correction unit 117 corrects the signal (FS signal) from the addition unit 131 on the basis of the signal (stray light component) from the stray light determination unit 122.

Here, the calculation of the stray light component and the correction of the FS signal according to the first embodiment will be described.

Firstly, the GE signal will be described.

Figure 6:
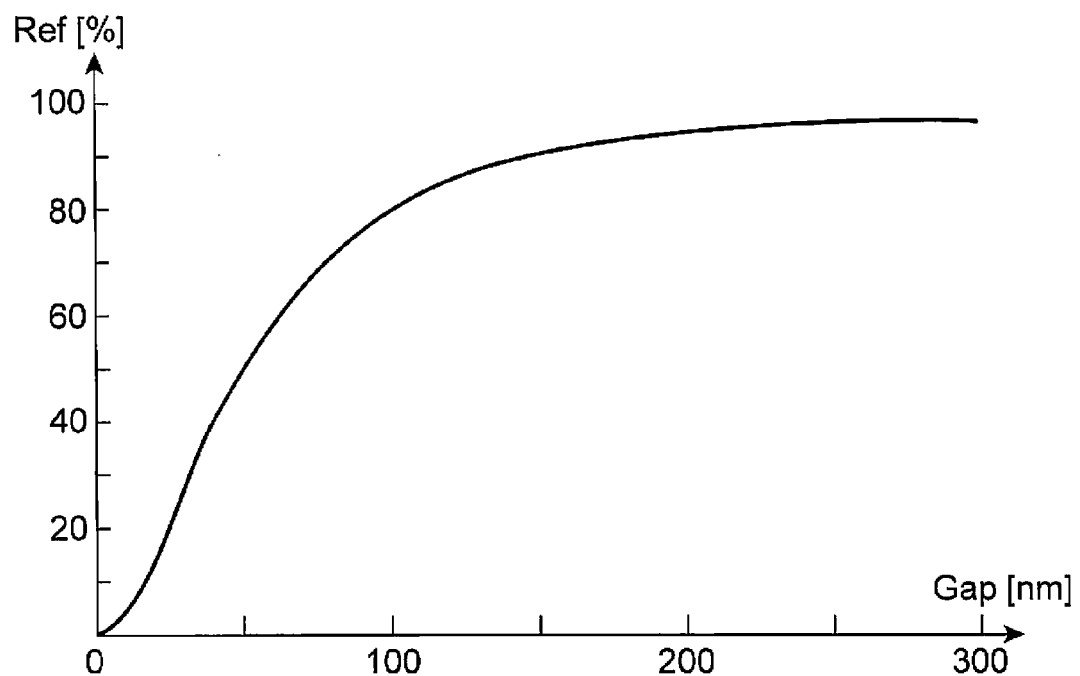
FIG. 6 is a diagram showing the relationship between the GE signal output and the air gap between the object lens optical system and the surface of the optical disk, according to the first embodiment of the present invention.

FIG. 6 is a diagram showing the relationship between the GE signal output and the air gap between the object lens optical system 107 and the surface of the optical disk 108, according to the first embodiment of the present invention. In FIG. 6, the horizontal axis Gap is the air gap between the light emission end face of the SIL 107b of the object lens optical system 107 and the surface of the light disk 108, and the vertical axis Ref is the reflectivity. Here, the reflectivity indicates the ratio of the GE signal output level with respect to the amount of light in the light beam which is incident on the object lens optical system 107.

The GE signal is a signal which determines the length of the air gap between the end face of the SIL 107b and the surface of the optical disk 108, by determining the amount of returned light which is fully reflected by the end face of the SIL 107b in the object lens optical system 107. If the air gap between the SIL 107b and the surface of the optical disk 108 is sufficiently large, then a far-field state arises, and the light which is incident at an angle producing full reflection at the end face of the SIL 107b is fully reflected by the end face of the SIL 107b. However, if the air gap is no more than approximately ¼ of the wavelength of the light beam and a near-field state is achieved, then a returned light component of which a portion is fully reflected is transmitted to the optical disk 108 side as evanescent light due to near-field coupling with the optical disk 108, and the amount of returned light that is fully reflected declines. If the end face of the SIL 107b and the surface of the optical disk 108 are in full contact, in other words, the air gap is zero, then all of the returned light component which is fully reflected at the end face of the SIL 107b is transmitted to the optical disk 108 side as evanescent light, and hence the amount of the fully reflected returned light component becomes zero. Consequently, the relationship between the air gap and the amount of fully reflected returned light has the characteristics shown in FIG. 6.

Next, the surface reflected light which is a stray light component will be described.

Figure 7:
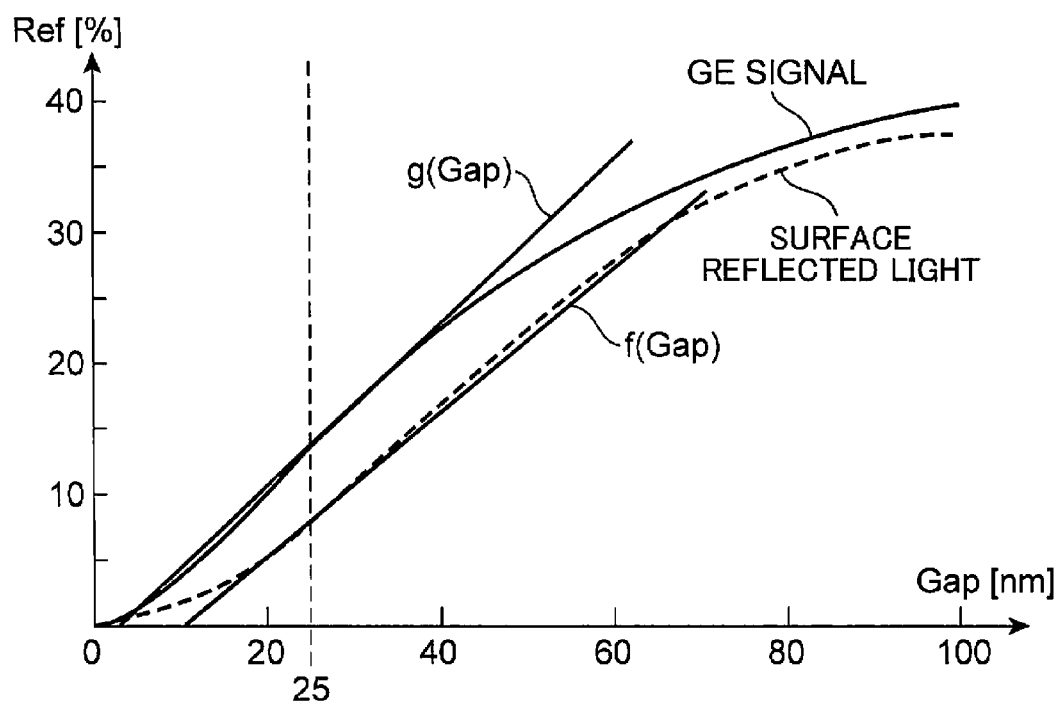
FIG. 7 is a diagram showing the relationship between the GE signal output and the air gap between the object lens optical system and the surface of the optical disk, and the relationship between the surface reflected light level and the air gap, according to the first embodiment of the present invention.

FIG. 7 is a diagram showing the relationship between the GE signal output and the air gap between the object lens optical system 107 and the surface of the optical disk 108, and the relationship between the surface reflected light level and the air gap, according to the first embodiment of the present invention. In FIG. 7, the horizontal axis Gap is the air gap, similarly to FIG. 6, and the vertical axis Ref is the reflectivity. Here, the reflectivity indicates the ratio of the GE signal output level and the surface reflected light level with respect to the amount of light in the light beam which is incident on the object lens optical system 107. Furthermore, in FIG. 7, the solid line represents the GE signal and the broken line represents the surface reflected light.

As shown in FIG. 7, the surface reflected light level and the GE signal output level decrease as the air gap changes from approximately ¼ of the wavelength to zero, and both become zero when the object lens optical system 107 and the surface of the optical disk 108 make contact. In the first embodiment, the fact that the surface reflectivity and the GE signal qualitatively have almost the same characteristics with respect to the air gap in a near-field state is utilized to calculate the surface reflected light, in other words, the stray light component included in the FS signal, on the basis of the GE signal.

For example, if the target air gap based on gap control is 25 nm, then the relationship between the surface reflected light and the air gap in the vicinity of the target air gap and the relationship between the GE signal and the air gap in the vicinity of the target air gap can respectively be approximated by a linear function f(Gap) and a linear function g(Gap), as shown in FIG. 7. It is possible to express the surface reflected light as a linear function of the GE signal by means of the linear function f(Gap) and linear function g(Gap) which have been approximated in this way.

Consequently, by multiplying the GE signal by the gain value in the gain multiplication unit 122*a* and adding this multiplication result to the offset value from the offset output unit 122*b* in the adder 122*c*, it is possible to calculate the surface reflected light, in other words, the stray light component included in the FS signal.

As described above, the stray light determination unit 122 according to the first embodiment may calculate the stray light component as a function (for example, a linear function) of the signal (GE signal) output from the first detector 110. In other words, the stray light determination unit 122 calculates a surface stray light component by inputting the output signal from the first detector 110 into a prescribed function. The prescribed function is a linear function which approximates the signal output from the first detector 110 to a surface stray light component.

Here, in the first embodiment, the relationship between the surface reflected light and the air gap and the relationship between the GE signal output at the air gap are calculated by using optical simulation results based on the envisaged parameters in the optical system. Consequently, the gain value of the gain multiplication unit 122*a*, and the offset value from the offset output unit 122*b* are fixed values which are determined from optical simulation results.

Moreover, the FS signal can be corrected by subtracting the output from the adder 122*c*, which is the stray light component included in the FS signal, from the FS signal, using the subtractor 117*a*, and thus excluding the stray light component from the FS signal.

As described above, in the first embodiment, the level of the surface reflected light which is the stray light component included in the FS signal is calculated using the first detector 110, the gain multiplication unit 122*a*, the offset output unit 122*b* and the adder 122*c*, and the stray light component is excluded from the FS signal by using the subtractor 117*a*.

Therefore, in an optical disk apparatus using a SIL, when there is a cover layer on the optical disk 108, the FS signal is corrected by excluding the stray light component from the FS signal, the FE signal is normalized correctly by using the corrected FS signal, and focusing control using a normalized FE signal (FE_AGC signal) becomes possible. Therefore, the determination gain is kept uniform, even if there is variation in the reflectivity of the information layer or variation in the light beam irradiation power during recording or reproduction, and hence stable focus control is possible, as a result of which it is possible to achieve improvement in the recording characteristics and reproduction characteristics of the optical disk apparatus.

In the first embodiment, the surface reflected light level which is the stray light component included in the FS signal is expressed as a linear function which approximates the GE signal to a stray light component, but it may also be expressed as a secondary or higher-order function.

By adopting the composition described above, it is possible to improve the determination accuracy of the stray light component included in the FS signal by means of the GE signal.

In the first embodiment, the gain value and the offset value when calculating the surface reflected light which is the stray light component included in the FS signal on the basis of the GE signal are fixed values based on the optical simulation results, but the present invention is not limited in particular to this. More specifically, in the optical disk apparatus according to a modification example of the first embodiment, a region for stray light component determination is provided on the information layer of the optical disk 108, and the gain value of the gain multiplication unit 122*a* and the offset value of the offset output unit 122*b* can be specified by using the FS signal and GE signal when the beam passes through the region for stray light component determination.

The operation of the optical disk apparatus according to the modification of the first embodiment is described below with reference to FIG. 8 and FIG. 9.

Figure 8:
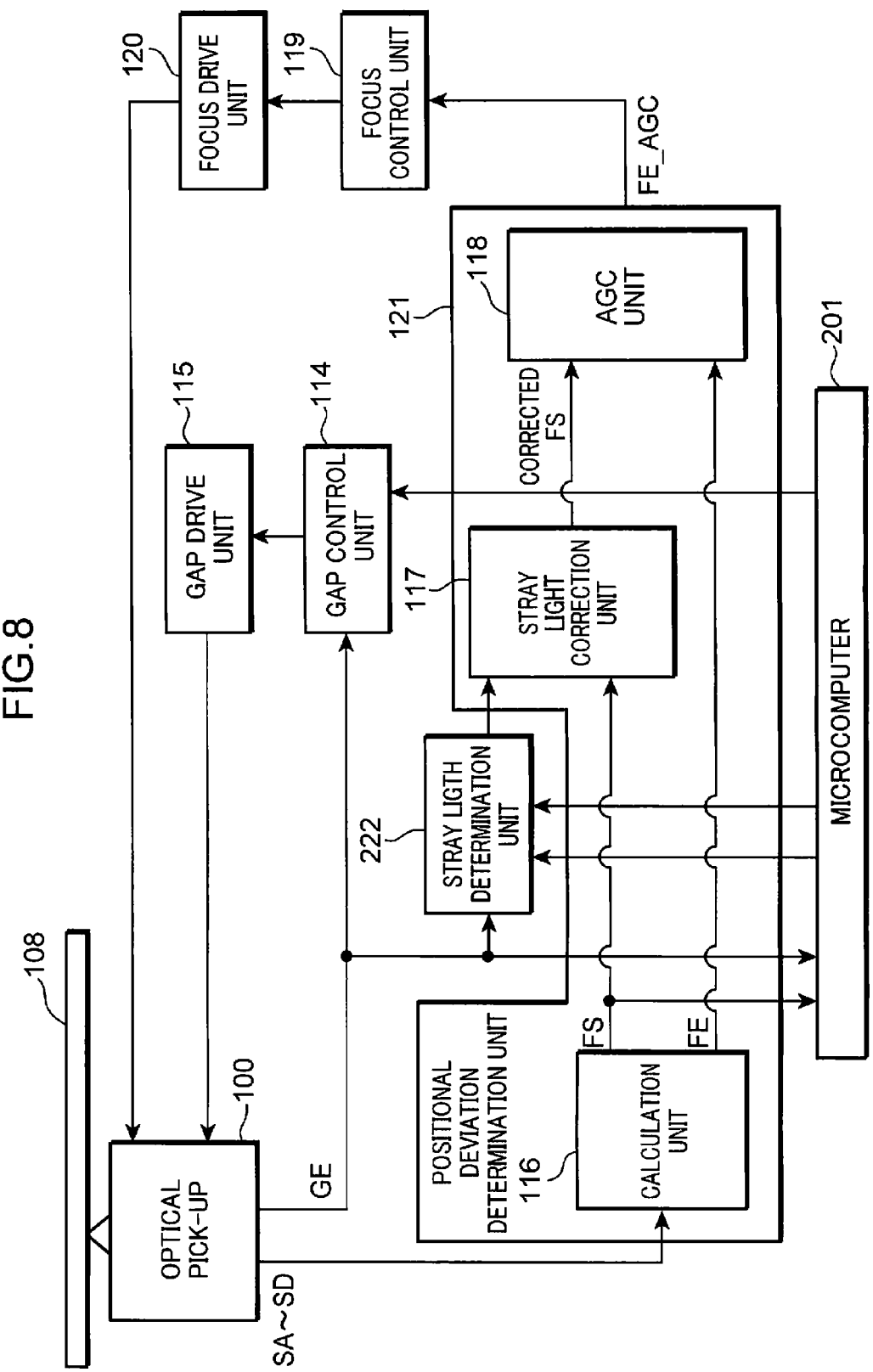
FIG. 8 is a block diagram showing a composition of an optical disk apparatus according to a modification of the first embodiment of the invention.

FIG. 8 is a block diagram showing a composition of an optical disk apparatus according to a modification of the first embodiment of the invention. FIG. 9 is a block diagram showing a composition of a stray light determination unit 222 and a stray light correction unit 117 in FIG. 8. In FIG. 8 and FIG. 9, constituent elements which are the same as the constituent elements in FIG. 1 to FIG. 5 are labeled with the same reference numerals and description thereof is omitted here.

The optical disk apparatus shown in FIG. 8 comprises: an optical pick-up 100, a gap control unit 114, a gap drive unit 115, a positional deviation determination unit 121, a stray light determination unit 222, a focus control unit 119, a focus drive unit 120 and a microcomputer 201. The positional deviation determination unit 121 includes a calculation unit 116, a stray light correction unit 117 and an AGC unit 118.

Figure 9:
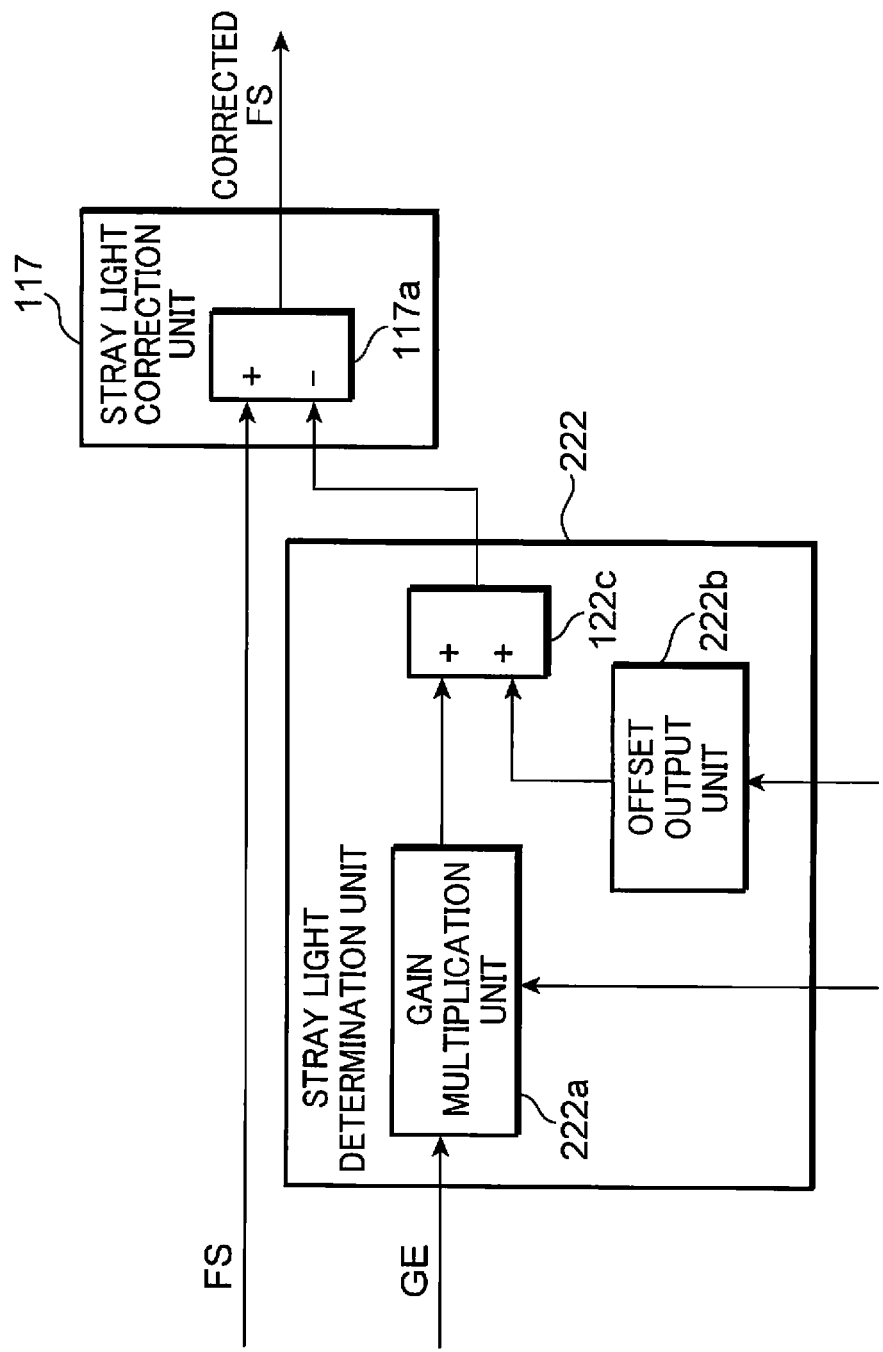
FIG. 9 is a block diagram showing a composition of the stray light determination unit and the stray light correction unit in FIG. 8.

Furthermore, as shown in FIG. 9, the stray light determination unit 222 includes a gain multiplication unit 222*a*, an offset output unit 222*b* and an adder 122*c*. The stray light correction unit 117 includes a subtractor 117*a*.

The information layer of the optical disk 108 has a transmitting region which does not reflect the light beam irradiated onto the information layer. This transmitting region is formed by providing a region where an information layer is not formed in one portion of the information layer, when forming the information layer.

The microcomputer 201 estimates a prescribed function which approximates the GE signal output from the first detector 110 to a surface stray light component. The microcomputer 201 sets a plurality of gap levels which are control targets of the gap control unit 114, and estimates the prescribed function on the basis of each of the set gap levels and the signal level from the addition unit 131 which is obtained when the light beam passes through the transmitting region at each gap level setting.

In the modification of the first embodiment, the stray light determination unit 222 corresponds to one example of a stray light determination unit and the microcomputer 201 corresponds to one example of a function estimation unit.

The operation of the optical disk apparatus according to a modification of the first embodiment composed as described above will now be explained.

The information layer of the optical disk 108 has a region (region for stray light component determination) which does not reflect the light beam irradiated onto the information layer. The first detector 110 converts the received light beam to an electrical signal to generate a GE signal, which is output to the gap control unit 114, the stray light determination unit 222 and the microcomputer 201. The adder 116*c* in the calculation unit 116 generates an FS signal by adding the input signal FEP to the input signal FEN, and outputs this FS signal to the stray light correction unit 117 and the microcomputer 201.

The microcomputer 201 outputs a target gap value, which is a control target for gap control, to the gap control unit 114, thereby setting the target gap value. The microcomputer 201 sets a plurality of target gap values in the gap control unit 114 as control targets. The gap control unit 114 performs gap control using the respective target gap values which have been set. The FS signal level and the GE signal level are determined while implementing gap control at each of the set target gap values. The microcomputer 201 calculates the gain value and offset value for calculating the stray light signal which is the stray light component included in the FS signal, from the GE signal, using the relationship between the FS signal levels and the GE signal levels which are determined when gap control is carried out at each of the target gap values. The microcomputer 201 sets the gain value from the calculation results in the gain multiplication unit 222a, and sets the offset value from the calculation results in the offset output unit 222b.

By means of the operations described above, focus control is achieved so that the focal point of the light beam is positioned accurately on the information layer of the optical disk 108, on the basis of the FE signal which has been normalized by using the corrected FS signal in which the stray light component has been excluded from the FS signal (FE_AGC signal).

Here, the calculation of the gain value in the gain multiplication unit 222a and the offset value in the offset output unit 222b by the microcomputer 201 in the composition of the modification of the first embodiment will now be described.

It is supposed that the light beam spot is focus controlled on a region where the light beam on the information layer of the optical disk 108 is not reflected. In this case, since the amount of returned light from the information layer is zero, then the signal level of the determined FS signal is a surface reflected light level which is a stray light component. Consequently, it is possible to acquire the relationship between the GE signal level and the surface reflected light level, which is the stray light component, when the gap control target is set to a certain air gap length, by determining the GE signal level and the FS signal level in this case.

Here, if the stray light signal, which is the stray light component included in the FS signal, is expressed as a linear function of the GE signal as in the present composition, then the gain value and the offset value of the linear function should be determined as described below. In other words, in a state where the focus of the light beam spot is controlled to a region where the light beam on the information layer of the optical disk 108 is not reflected, the microcomputer 201 sets at least two target values which are gap control targets and the GE signal level and the FS signal level at the respective target gap values are determined. The microcomputer 201 calculates the gain value of the gain multiplication unit 222a and the offset value of the offset output unit 222b, from the results of the GE signal level and the FS signal level which are determined at each target gap value.

As described above, the microcomputer 201 according to the modification of the first embodiment sets a plurality of gap levels (target gap values) which are control targets of the gap control unit 114, and the prescribed function can be estimated on the basis of each of the set gap levels (GE signal level) and the signal (FS signal) level from the addition unit 131 obtained when the light beam passes through the region for stray light component determination at each gap level setting.

By adopting the composition described above, even if the optical parameters for specifying the stray light component included in the FS signal change from the design values, due, for instance, to variation in the components used by the optical pick-up 100, variation in the adjustment process of the optical pick-up 100, variation in the material used in the cover layer of the optical disk 108, and so on, the microcomputer 201 calculates an optimal gain value and offset value for use in calculating the stray light component by using a region for stray light component determination which is provided on the information layer of the optical disk 108, and therefore it is possible to calculate the stray light component accurately.

In the first embodiment, by using the FE_AGC signal which has been normalized by the corrected FS signal, it is possible to achieve stable focus control, but similar beneficial effects are also obtained in relation to tracking control. More specifically, a TE (tracking error) signal is generated in relation to the output signals SA to SD from the second detector 112 by the push-pull method, and tracking control is carried out by using a TE_AGC signal in which the generated TE signal has been normalized by the corrected FS signal.

By adopting the composition described above, in an optical disk apparatus using a SIL, when there is a cover layer on the optical disk 108, the FS signal is corrected by excluding the stray light component from the FS signal, the TE signal is normalized correctly by using the corrected FS signal, and tracking control using a normalized TE signal (TE_AGC signal) becomes possible. Therefore, the determination gain is kept uniform, even if there is variation in the reflectivity of the information layer or variation in the light beam irradiation power during recording or reproduction, and hence stable tracking control is possible, as a result of which it is possible to achieve improvement in the recording characteristics and reproduction characteristics of the optical disk apparatus.

(Second Embodiment)

Figure 10:
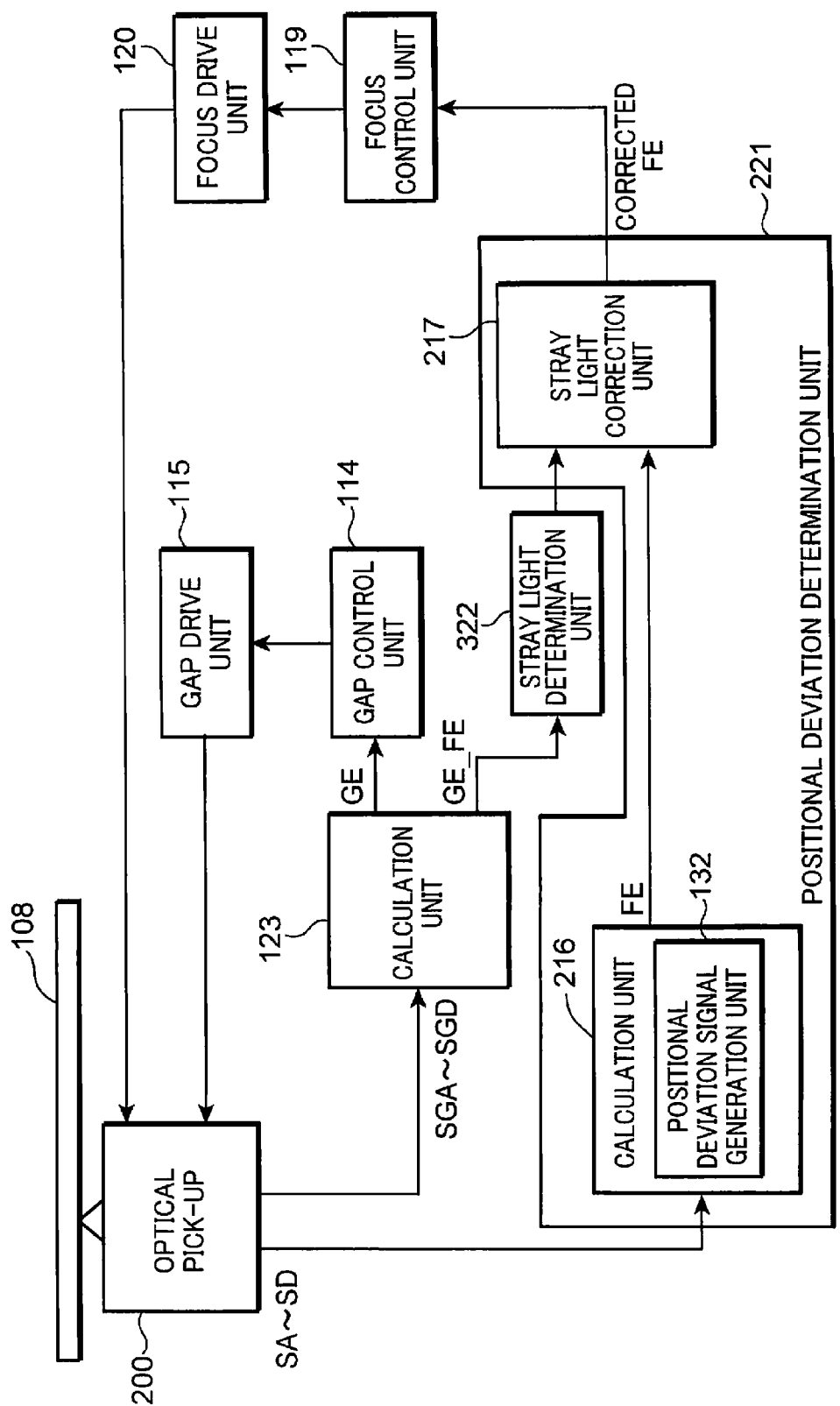
FIG. 10 is a block diagram showing a composition of an optical disk apparatus according to a modification of a second embodiment of the invention.
Figure 11:
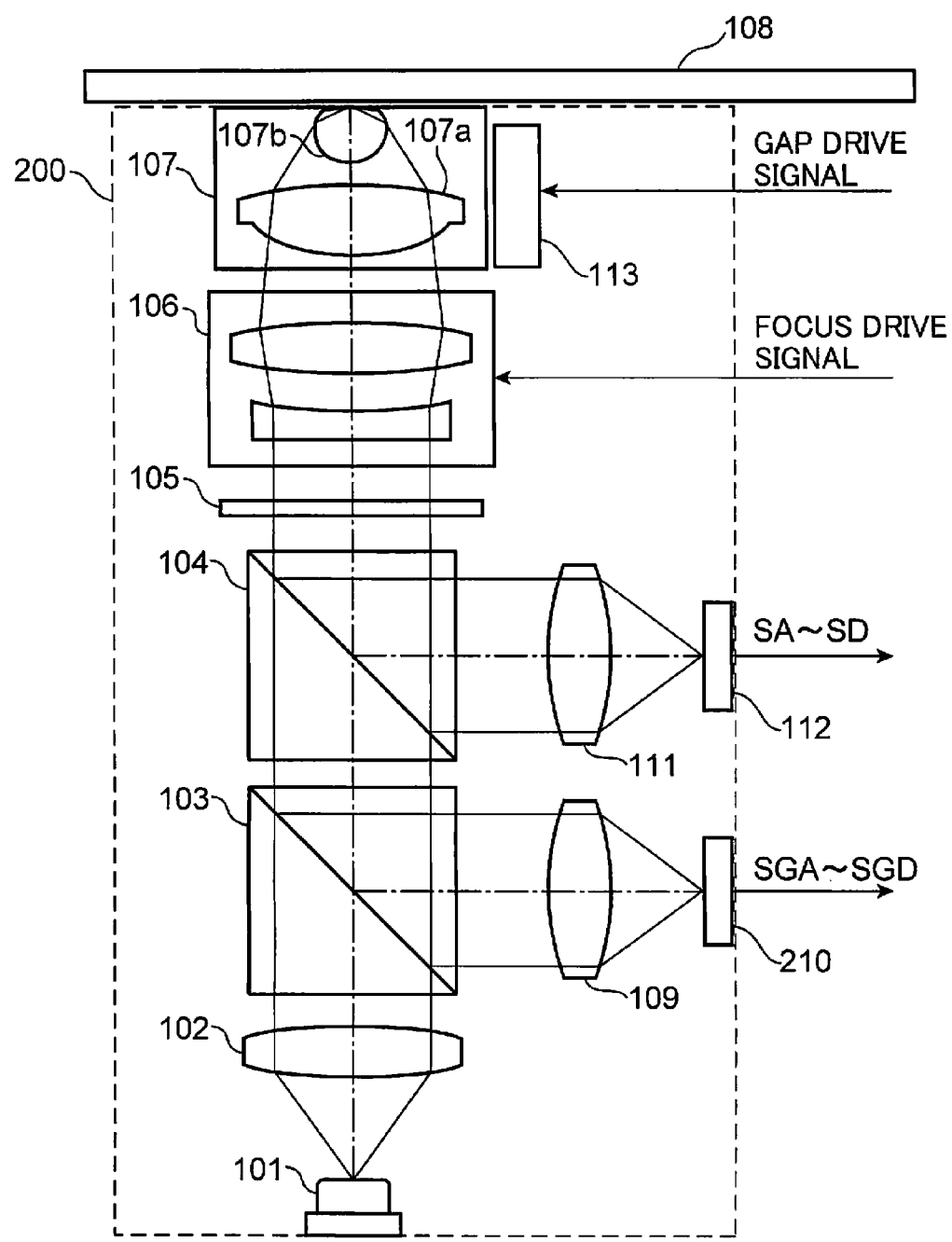
FIG. 11 is a block diagram showing a composition of the optical pick-up in FIG. 10.
Figure 12:
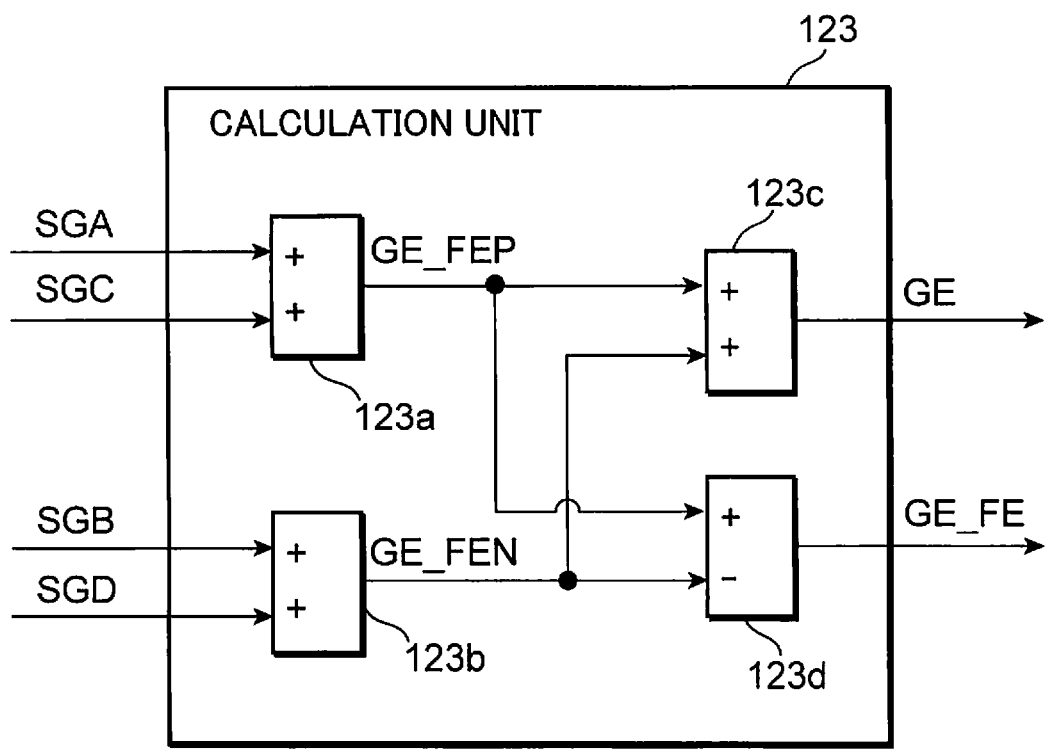
FIG. 12 is a block diagram showing a composition of the calculation unit in FIG. 10.
Figure 13:
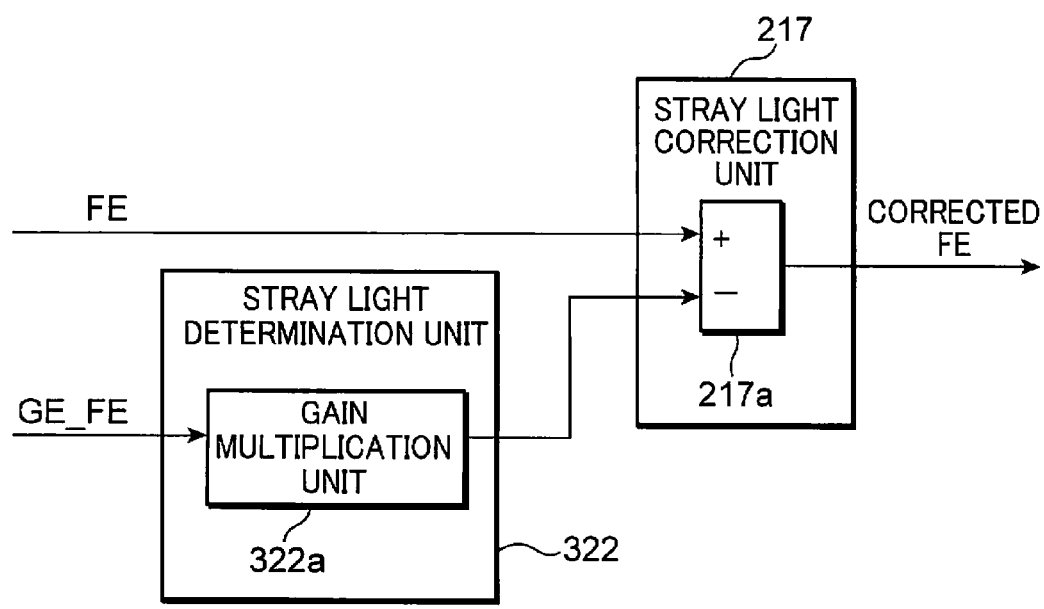
FIG. 13 is a block diagram showing a composition of the stray light determination unit and the stray light correction unit in FIG. 10.

FIG. 10 is a block diagram showing a composition of an optical disk apparatus according to a modification of a second embodiment of the invention. FIG. 11 is a block diagram showing a composition of the optical pick-up 200 in FIG. 10. FIG. 12 is a block diagram showing a composition of a calculation unit 123 in FIG. 10. FIG. 13 is a block diagram showing a composition of a stray light determination unit 322 and a stray light correction unit 217 in FIG. 10. Parts which are similar to the first embodiment are labeled with the same reference numerals and description thereof is omitted here.

As shown in FIG. 10, the optical disk apparatus according to the second embodiment comprises: an optical pick-up 200, a gap control unit 114, a gap drive unit 115, a positional deviation determination unit 221, a stray light determination unit 322, a focus control unit 119, a focus drive unit 120 and a calculation unit 123. The positional deviation determination unit 221 includes a calculation unit 216, and a stray light correction unit 217.

As shown in FIG. 11, the optical pick-up 200 according to the second embodiment includes: a light source 101, a collimating lens 102, a beam splitter 103, a polarizing beam splitter 104, a ¼ wavelength plate 105, a beam expander 106, an object lens optical system 107, a first determination lens 109, a first detector 210, a second determination lens 111, a second detector 112 and a gap actuator 113.

Moreover, as shown in FIG. 12, the calculation unit 123 includes an adder 123a, an adder 123b, an adder 123c and a subtractor 123d.

Furthermore, as shown in FIG. 13, the stray light determination unit 322 includes a gain multiplication unit 322a, and the stray light correction unit 217 includes a subtractor 217a.

The first detector 210 has light receiving regions which are divided into a plurality of regions, similarly to the second detector 112. The positional deviation determination unit 221 includes a positional deviation signal generation unit 132 which generates a focusing direction positional deviation signal or a tracking direction positional deviation signal by calculating a plurality of signals from the second detector 112.

The calculation unit 123 carries out similar calculation to the positional deviation signal generation unit 132, on the plurality of signals from the first detector 210. The stray light determination unit 322 determines the surface stray light component, on the basis of the signal from the calculation unit 123. The stray light correction unit 217 corrects the signal output from the positional deviation signal generation unit 132 on the basis of the surface stray light component determined by the stray light determination unit 322.

The calculation unit 216 includes a positional deviation signal generation unit 132. As described hereinafter, the positional deviation signal generation unit 132 according to the second embodiment generates a focusing direction positional deviation signal or a tracking direction positional deviation signal by calculating a plurality of signals from the second detector 112.

Furthermore, as described below, the calculation unit 123 according to the second embodiment carries out similar calculation to the positional deviation signal generation unit 132 of the calculation unit 116, on the plurality of signals from the first detector 210.

In the second embodiment, the first detector 210 corresponds to one example of a first light receiving unit, the positional deviation signal generation unit 132 corresponds to one example of a positional deviation signal generation unit, the calculation unit 123 corresponds to one example of a calculation unit, the stray light determination unit 322 corresponds to one example of a stray light determination unit and the stray light correction unit 217 corresponds to one example of a stray light correction unit.

The operation of an optical disk apparatus which is composed as described above will now be explained.

The light beam which has been transmitted through the polarizing beam splitter 104 is reflected by the beam splitter 103, converted into converging light by the first determination lens 109 and received by the first detector 210.

Figure 14:
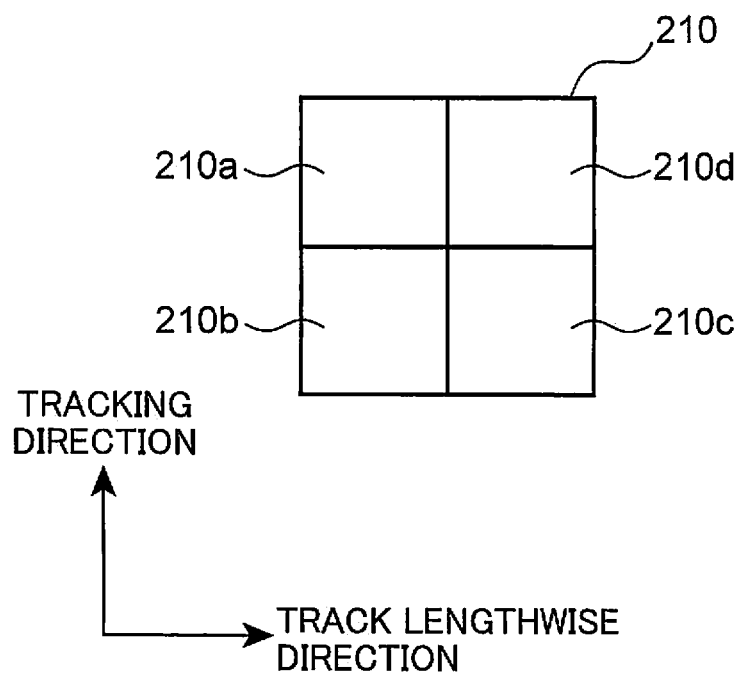
FIG. 14 is a plan diagram showing a composition of the first detector according to a second embodiment of the present invention.

Here, FIG. 14 shows a plan diagram of the first detector 210. FIG. 14 is a plan diagram showing a composition of the first detector 210 according to a second embodiment of the present invention. In FIG. 14, the up/down direction in the plane of the drawing is the tracking direction of the optical disk 108, and the left/right direction in the plane of the drawing is the track lengthwise direction. As shown in FIG. 14, similarly to the second detector 112, the first detector 210 is divided into four parts to create four light receiving regions 210a, 210b, 210c, 210d. In other words, the first detector 210 according to the second embodiment includes a plurality of divided light receiving regions 210a, 210b, 210c, 210d, similarly to the second detector 112. The light receiving regions 210a, 210b, 210c, 210d respectively output signals SGA, SGB, SGC, SGD.

The first detector 210 converts a received light beam into an electrical signal and outputs signals SGA to SGD to the calculation unit 123. The adder 123a in the calculation unit 123 generates a signal GE_FEP by adding the input signal SGA to the input signal SGC, and outputs this signal GE_FEP to the adder 123c and the subtractor 123d. The adder 123b in the calculation unit 123 generates a signal GE_FEN by adding the input signal SGB to the input signal SGD, and outputs this signal GE_FEN to the adder 123c and the subtractor 123d. The adder 123c generates a GE signal by adding the input signal GE_FEP to the input signal GE_FEN, and outputs this GE signal to the gap control unit 114. The subtractor 123d generates a signal GE_FE which has undergone similar calculation to the FE signal, by subtracting the input signal GE_FEN from the input signal GE_FEP, and outputs this signal GE_FE to the stray light correction unit 217. The subtractor 116d in the calculation unit 216 generates an FE signal by subtracting the input signal FEN from the input signal FEP, and outputs this FE signal to the stray light correction unit 217.

The gain multiplication unit 322a in the stray light determination unit 322 generates a stray light signal, which is the stray light component included in the FE signal, by multiplying the input signal GE_FE by a prescribed gain value, and outputs this stray light signal to the subtractor 217a of the stray light correction unit 217. The subtractor 217a generates a corrected FE signal, which is an FE signal in which the stray light component has been corrected, by subtracting the input stray light signal from the input FE signal, and outputting the corrected FE signal to the focus control unit 119. The focus control unit 119 carries out phase compensation processing and low-band compensation processing on the input corrected FE signal, and outputs the resulting signal to the focus drive unit 120 as a focus drive signal.

By means of the operations described above, focus control is achieved to implement control so that the focal point of the light beam is positioned accurately on the information layer of the optical disk 108, by using the corrected FE signal from which the stray light component has been excluded.

Here, the calculation of the stray light component and the correction of the FE signal according to the second embodiment will be described.

Firstly, the stray light component included in the FE signal will be described.

If the end face of the SIL 107b of the object lens optical system 107 is inclined with respect to the surface of the optical disk 108, then the air gap length varies with the position on the end face of the SIL 107b. From FIG. 7, the amount of surface reflected light which is the stray light component included in the returned light received by the second detector 112 varies with the length of the air gap. Therefore, the amount of surface reflected light included in the amount of returned light determined by the second detector 112 varies depending on the light receiving region. If the amount of surface reflected light, which is the stray light component, varies depending on the light receiving region on the second detector 112, then as a result of generating the FE signal, an offset occurs in the FE signal due to the stray light component.

Next, the calculation of the stray light component included in the FE signal and the correction of the FE signal will be described.

From FIG. 7, the characteristics corresponding to the surface reflected light which is the stray light component included in the returned light received by the second detector 112 almost coincide qualitatively with the characteristics of the returned light from the end face of the SIL 107b. Furthermore, the amount of returned light determined by the first detector 210 is the same as the amount of returned light determined by the first detector 110 in the first embodiment. Consequently, the amount of returned light determined by the first detector 210 for generating the GE signal varies with the light receiving region and the distribution of the amount of returned light which is determined by the first detector 210 substantially matches the distribution of the amount of surface reflected light which is determined by the second detector 112.

In other words, for the signals SGA to SGD which are the output signals from the first detector 210, the GE_FE signal obtained by similar calculation to that used in generating the FE signal corresponds to the offset generated by the stray light component included in the FE signal.

Furthermore, from FIG. 7, the amount of the surface reflected light and the amount of returned light at the first detector 210 when the air gap is in the vicinity of 25 nm can respectively be approximated by the linear function f(Gap) and the linear function g(Gap). Consequently, when the target gap value of the gap control is 25 nm, and the ratio f(25)/g(25) between the amount of light f(25) and the amount of light g(25) is set as the gain value which is multiplied by the gain multiplication unit 322a, then the output signal from the gain multiplication unit 322a is a signal which indicates the offset due to the stray light component included in the FE signal.

By subtracting the signal indicating the offset due to the stray light component included in the FE signal from the FE signal by using the subtractor 217a, it is possible to exclude the offset due to the stray light component included in the FE signal and thus correct the FE signal.

As described above, in the optical disk apparatus according to the second embodiment, the stray light component is determined on the basis of a signal from the calculation unit 123. Furthermore, the stray light correction unit 217 excludes the stray light component included in the signal from the positional deviation signal generation unit 132, on the basis of the signal from the stray light determination unit 322.

In this case, the stray light determination unit 322 may calculate the stray light component as a function (for example, a linear function) of the signal output from the calculation unit 123. In other words, the stray light determination unit 322 calculates a surface stray light component by inputting the signal output from the calculation unit 123 into the prescribed function. The prescribed function is a linear function which approximates the signal output from the calculation unit 123 to a surface stray light component.

As described above, in the second embodiment, the offset due to the surface reflected light which is the stray light component included in the FE signal is calculated using the first detector 210, the calculation unit 123 and the gain multiplication unit 322a, and the offset due to the stray light component is excluded from the FE signal by using the subtractor 217a.

Therefore, in an optical disk apparatus using a SIL, when there is a cover layer on the optical disk 108, the FE signal is corrected by excluding the offset due to the stray light component from the FE signal, and focusing control can be achieved by using the corrected FE signal. Consequently, it is possible to achieve stable and highly accurate focusing control, as a result of which improvements in the recording characteristics and the reproduction characteristics of the optical disk apparatus can be achieved.

In the second embodiment, the offset due to the stray light component included in the FE signal is expressed as a linear function which approximates the GE_FE signal to the stray light component, but it may also be expressed as a secondary or higher-order function.

By adopting the composition described above, it is possible to improve the determination accuracy of the offset due to the stray light component included in the FE signal, by calculation on the basis of the GE_FE signal.

In the second embodiment, the gain values for calculating the offset due to the stray light component included in the FE signal on the basis of the GE_FE signal were set as fixed values based on optical simulation results, but the present invention is not limited in particular to this. More specifically, in an optical disk apparatus according to a modification of the second embodiment, the gain value in the gain multiplication unit 322a can be learnt by using an indicator which indicates the reproduction signal quality when reproducing information recorded on an optical disk 108.

The operation of the optical disk apparatus according to the modification of the second embodiment is described below with reference to FIG. 15 and FIG. 16.

Figure 15:
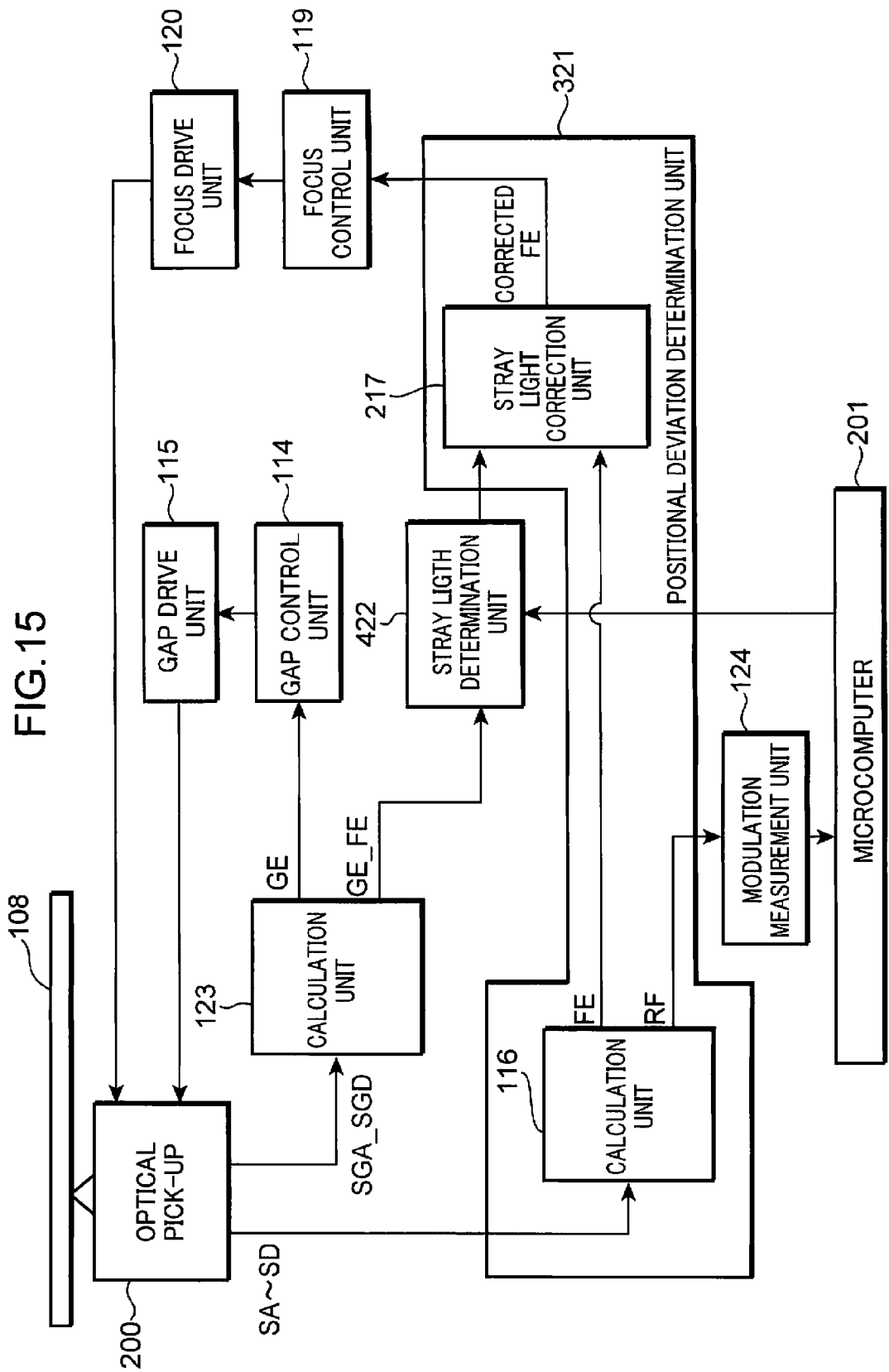
FIG. 15 is a block diagram showing a composition of an optical disk apparatus according to a modification of the second embodiment of the invention.

FIG. 15 is a block diagram showing a composition of an optical disk apparatus according to a modification of the second embodiment of the invention. FIG. 16 is a block diagram showing a composition of a stray light determination unit 422 and a stray light correction unit 217 in FIG. 15. In FIG. 15 and FIG. 16, constituent elements which are the same as the constituent elements in FIG. 10 to FIG. 14 are labeled with the same reference numerals and description thereof is omitted here.

The optical disk apparatus shown in FIG. 15 comprises: an optical pick-up 200, a gap control unit 114, a gap drive unit 115, a positional deviation determination unit 321, a stray light determination unit 422, a focus control unit 119, a focus drive unit 120, a calculation unit 123, a modulation measurement unit 124 and a microcomputer 201. The positional deviation determination unit 121 includes a calculation unit 116, and a stray light correction unit 217.

Figure 16:
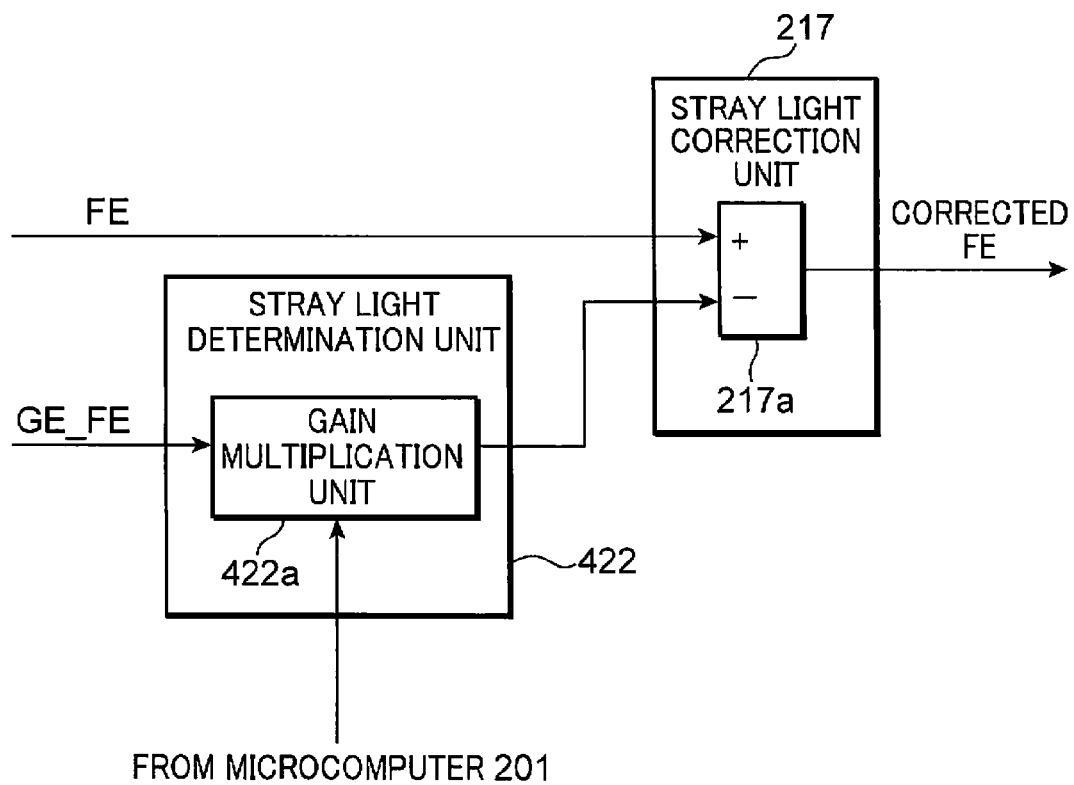
FIG. 16 is a block diagram showing a composition of the stray light determination unit and the stray light correction unit in FIG. 15.
Figure 17:
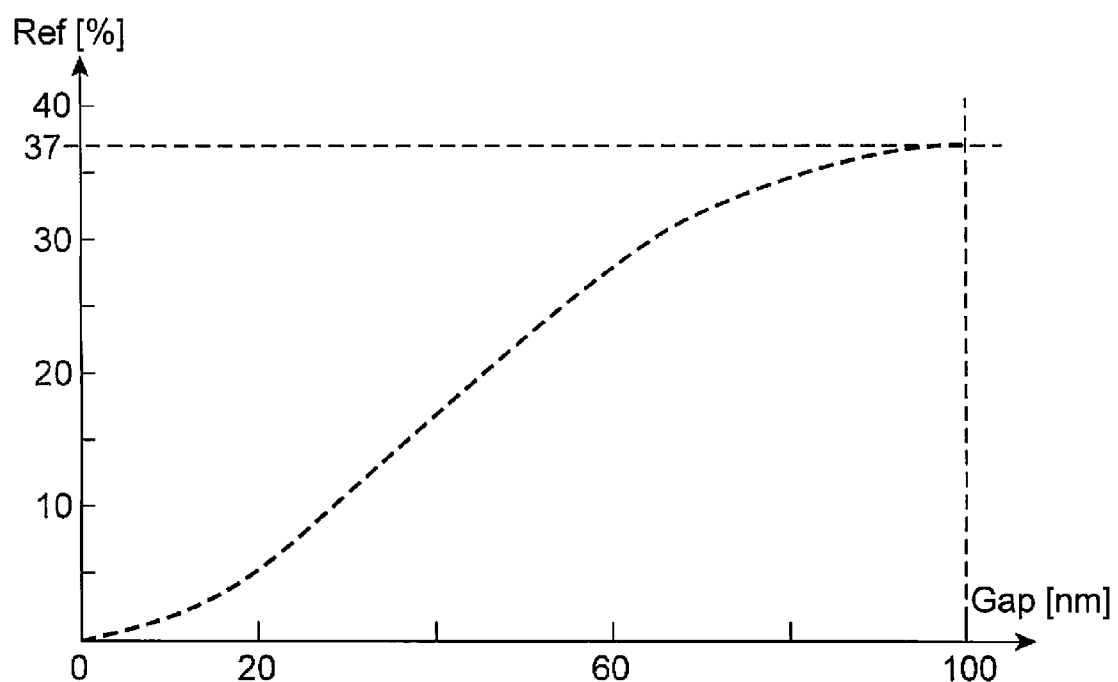
FIG. 17 is a diagram showing a relationship between a near-field air gap and the level of surface reflected light, in a conventional optical disk apparatus.

Furthermore, as shown in FIG. 16, the stray light determination unit 422 includes a gain multiplication unit 422a. The stray light correction unit 217 includes an subtractor 217a.

The modulation measurement unit 124 measures the signal quality of the reproduction signal obtained by reproducing the information recorded on the information layer. The microcomputer 201 estimates the coefficient for the signal output from the calculation unit 123, in the linear function. The microcomputer 201 sets a plurality of candidate coefficients in the stray light determination unit 422, and calculates an optimal coefficient on the basis of a combination of each of the set candidate coefficients and the measurement result from the modulation measurement unit 124 obtained when each candidate coefficient is set. More specifically, the microcomputer 201 approximates a plurality of combinations of each of the set candidate coefficients and the signal quality from the modulation measurement unit 124 which is obtained when each candidate coefficient is set, by a secondary function, for instance, and calculates the coefficient yielding the peak value of the signal quality, as the optimal coefficient.

In the modification of the second embodiment, the modulation measurement unit 124 corresponds to one example of a reproduction signal quality measurement unit, the positional deviation determination unit 321 corresponds to one example of a positional deviation determination unit, the stray light determination unit 422 corresponds to one example of a stray light determination unit, and the microcomputer 201 corresponds to one example of a coefficient estimation unit.

The operation of the optical disk apparatus according to a modification of the second embodiment composed as described above will now be explained.

The microcomputer 201 sets the gain value of the gain multiplication unit 422a in the stray light determination unit 422. The gain multiplication unit 422a in the stray light determination unit 422 generates a stray light signal, which is the stray light component included in the FE signal, by multiplying the input GE_FE signal by the gain value set by the microcomputer 201, and outputs this stray light signal to the subtractor 217a of the stray light correction unit 217.

The adder 116c in the calculation unit 116 (see FIG. 3) generates an RF signal (reproduction signal) by adding the input signal FEP with the input signal FEN, and outputs this RF signal to the modulation measurement unit 124.

The modulation measurement unit 124 measures the modulation of the input RF signal and outputs the modulation value from this measurement result to the microcomputer 201.

The microcomputer 201 sets a plurality of gain values for the gain multiplication unit 422a, and saves combinations of each of the set gain values and the modulation value measured by the modulation measurement unit 124 obtained at each of the respective gain value settings.

The microcomputer 201 calculates the optimal gain value which yields the largest modulation value, from the saved combinations of gain values and modulation values. The microcomputer 201 approximates the saved plurality of combinations of the gain value and the modulation value, by a secondary function, for example, and calculates the gain value which gives the largest modulation value as the optimal gain value.

The microcomputer 201 sets the optimal gain value thus calculated as the gain value for the gain multiplication unit 422a.

By means of the operations described above, it is possible to learn the optimal gain value for the gain multiplication unit 422a, by using the modulation value, which is an indicator of the reproduction signal quality when reproducing information recorded on an optical disk 108.

As described above, the optical disk apparatus according to a modification of the second embodiment includes a reproduction signal quality measurement unit (modulation measurement unit 124) which measures the signal quality (for example, the modulation value) when reproducing information recorded on an information layer, on the basis of a signal (RF signal) from the addition unit 131 (the adder 116a, the adder 116b and the adder 116c). Furthermore, the optical disk apparatus according to a modification of the second embodiment includes a coefficient estimation unit (microcomputer 201) which estimates the coefficient for the signal output from the calculation unit 123 in the linear function (a gain value of the gain multiplication unit 422a). In this case, the coefficient estimation unit (microcomputer 201) sets a plurality of candidate coefficients in the gain multiplication unit 422a, and calculates an optimal coefficient (optimal gain value) on the basis of a combination of each of the set candidate coefficients and the measurement result from the reproduction signal quality measurement unit (modulation measurement unit 124) obtained when each candidate coefficient is set.

By adopting the composition described above, even if the optical parameters for specifying the stray light component included in the FE signal change from the design values, due, for instance, to variation in the components used by the optical pick-up 200, variation in the adjustment process of the optical pick-up 200, variation in the material used in the cover layer of the optical disk 108, and so on, since the microcomputer 201 calculates an optimal gain value for use in calculating the stray light component by using a modulation value which indicates a signal quality when reproducing information recorded on the information layer of the optical disk 108, then it is possible to calculate the stray light component accurately.

In the modification of the second embodiment, a composition is adopted in which the modulation value of the RF signal is used as an indicator of the reproduction signal quality, but the reproduction signal quality indicator used when calculating an optimal gain value in the microcomputer 201 is not limited to the modulation value.

In the second embodiment and the modification of the second embodiment, it is possible to achieve stable and highly accurate focus control by using, for correcting the FE signal, the GE_FE signal obtained by similar calculation to that used in generating the FE signal, and similar beneficial effects are also obtained in respect of tracking control.

More specifically, a TE signal is generated by the push-pull method in respect of the output signals SA to SD from the second detector 112, a GE_TE signal is generated by similar calculation to that when generating the TE signal, in respect of the output signals SGA to SGD from the first detector 210, a corrected TE signal is generated by using the generated GE_TE signal as the stray light component included in the TE signal in order to correct the TE signal, and tracking control is carried out by using the corrected TE signal.

Therefore, by adopting the composition described above, in an optical disk apparatus using a SIL, when there is a cover layer on the optical disk 108, the TE signal is corrected by excluding the offset due to the stray light component from the TE signal, and tracking control can be achieved by using the corrected TE signal. Consequently, it is possible to achieve stable and highly accurate tracking control, as a result of which improvements in the recording characteristics and the reproduction characteristics of the optical disk apparatus can be achieved.

In the optical disk apparatus according to the first and second embodiments, it is possible to record and/or reproduce information to and/or from an optical disk 108 by light emitted from a SIL.

Alternatively, the optical disk apparatus according to the first and second embodiments described above may be applied to a recording/reproduction apparatus which is equipped with a recording and reproduction unit including near-field light generating elements for recording and/or reproducing information to and/or from an optical disk.

This near-field light generating element may be, for example, a metal plate having an overall composition which is larger than the spot of converging light and is formed to be thin and long. The metal plate is formed, for example, so as to include a small hole opened in an interior portion the metal plate, and a projecting section created by sharpening a portion of the hole. Desirably, the material of the metal plate is a material which produces Plasmon resonance in accordance with the wavelength of the light beam used. The material of the metal plate may be gold (Au), for example.

When the light beam is condensed on the near-field light generating element, near-field light is generated. By irradiating the near-field light onto the optical disk, it is possible to record and/or reproduce information to and/or from the optical disk.

In a recording/reproduction apparatus which includes a recording and reproduction unit having a near-field light generating element and which records and/or reproduces information by the recording and reproduction unit, it is possible to use the optical disk apparatus according to the first and second embodiments described above separately for the purpose of gap control, tracking control or focus control.

Therefore, it is possible to control the position of the light beam spot on the information layer by using a corrected control signal in which stray light has been corrected. Therefore, the stability of control is improved and the recording characteristics and reproduction characteristics by the recording and reproduction unit including a near-field light generating element can be improved.

The concrete embodiments described above principally include an invention having the following composition.

The optical disk apparatus relating to one aspect of the present invention includes: a light source which emits a light beam; a condensing optical system which is arranged in the vicinity of a surface of an information carrier and which condenses near-field light generated from a light beam emitted from the light source, onto the information carrier; a focusing unit which focuses the light beam on a prescribed information layer of the information carrier; a first light receiving unit which receives reflected light that has been reflected by an emission end face of the condensing optical system; a gap control unit which controls a distance between the condensing optical system and the surface of the information carrier, on the basis of a signal from the first light receiving unit; a second light receiving unit which receives reflected light from the prescribed information layer, in a plurality of divided light receiving regions; a positional deviation determination unit which determines positional deviation between a focal point of the light beam and a point where information on the prescribed information layer is recorded or reproduced, on the basis of a signal from the second light receiving unit; and a stray light determination unit which determines a surface stray light component which is reflected light from the surface of the information carrier and which is included in a signal from the positional deviation determination unit, on the basis of the signal from the first light receiving unit, wherein the positional deviation determination unit includes a stray light correction unit which corrects a signal output from the positional deviation determination unit on the basis of the surface stray light component determined by the stray light determination unit.

According to this composition, the light source emits a light beam. The condensing optical system is arranged in the vicinity of a surface of an information carrier and condenses near-field light generated from a light beam emitted from the light source, onto the information carrier. The focusing unit focuses the light beam on a prescribed information layer of the information carrier. The first light receiving unit receives reflected light reflected by the emission end face of the condensing optical system. The gap control unit controls a distance between the condensing optical system and the surface of the information carrier, on the basis of a signal from the first light receiving unit. The second light receiving unit receives reflected light from the prescribed information layer in a plurality of divided light receiving regions. The positional deviation determination unit determines positional deviation between a focal point of the light beam and a point where information on the prescribed information layer is recorded or reproduced, on the basis of a signal from the second light receiving unit. The stray light determination unit determines a surface stray light component which is reflected light from a surface of the information carrier and which is included in a signal from the positional deviation determination unit, on the basis of a signal from the first light receiving unit. The stray light correction unit of the positional deviation determination unit corrects the signal output from the positional deviation determination unit on the basis of the surface stray light component determined by the stray light determination unit.

Therefore, since the signal output from the positional deviation determination unit is corrected on the basis of the surface stray light component and this corrected signal is used to control the positioning of the focal point of the light bean and the point where information is recorded or reproduced on the prescribed information layer, then the determination gain is kept uniform even if there is variation in the reflectivity of the information layer or the optical beam irradiation power during recording or reproduction, and stable focus control or tracking control can be achieved.

Furthermore, in the optical disk apparatus described above, desirably, the positional deviation determination unit further includes: an addition unit which adds up a plurality of signals from the second light receiving unit; a positional deviation signal generation unit which generates a focusing direction positional deviation signal or a tracking direction positional deviation signal by calculating a plurality of signals from the second light receiving unit; and a normalization unit which generates a normalized signal by dividing a focusing direction positional deviation signal or tracking direction positional deviation signal from the positional deviation signal generation unit, by a signal from the stray light correction unit, and the stray light correction unit corrects the signal from the addition unit on the basis of the surface stray light component determined by the stray light determination unit, and outputs the corrected signal to the normalization unit.

According to this composition, the addition unit adds up a plurality of signals from the second light receiving unit. The positional deviation signal generation unit generates a focusing direction positional deviation signal or a tracking direction positional deviation signal by calculating a plurality of signals from the second light receiving unit. The normalization unit generates a normalized signal by dividing the focusing direction positional deviation signal or the tracking direction positional deviation signal from the positional deviation signal generation unit by the signal from the stray light correction unit. The stray light correction unit corrects the signal from the addition unit on the basis of the surface stray light component determined by the stray light determination unit, and outputs the corrected signal to the normalization unit.

Therefore, the signal from the addition unit is corrected on the basis of the surface stray light component determined by the stray light determination unit and focus control or tracking control can be carried out by using a normalized signal which has been normalized by dividing the focusing direction positional deviation signal or the tracking direction positional deviation signal by the corrected signal.

Moreover, in the optical disk apparatus described above, desirably, the stray light determination unit calculates the surface stray light component by inputting a signal output from the first light receiving unit to a prescribed function.

According to this composition, since the surface stray light component is calculated by inputting the signal output from the first light receiving unit into a prescribed function, then it is possible readily to calculate the surface stray light component.

Moreover, in the optical disk apparatus described above, desirably, the prescribed function is a linear function which approximates the signal output from the first light receiving unit to the surface stray light component.

According to this composition, the prescribed function is a linear function which approximates the signal output from the first light receiving unit to a surface stray light component, and therefore it is possible readily to calculate a surface stray light component by adding the prescribed offset value as well as multiplying the signal output from the first light receiving unit by a prescribed gain value.

Furthermore, in the optical disk apparatus described above, desirably, the information layer of the information carrier has a transmitting region which does not reflect a light beam irradiated onto the information layer, the optical disk apparatus further comprises a function estimation unit which estimates the prescribed function, and the function estimation unit sets a plurality of gap levels which are control targets for the gap control unit and estimates the prescribed function on the basis of each of the gap levels which have been set and a level of the signal from the addition unit obtained when the light beam passes through the transmitting region at the time of setting each gap level.

According to this composition, the information layer of the information carrier has a transmitting region which does not reflect the light beam irradiated onto the information layer. The function estimation unit sets a plurality of gap levels which are control targets for the gap control unit and estimates the prescribed function on the basis of each of the gap levels which have been set and the level of the signal from the addition unit obtained when the light beam passes through the transmitting region at the time of setting each gap level.

Therefore, even if the optical parameters which specify the surface stray light component vary from the design values, due, for instance, to variation in the components used in the optical disk apparatus, variation in the adjustment process of the optical disk apparatus, variation in the material used in the cover layer of the information carrier, and the like, since an optimal function for calculating the surface stray light component is estimated by using a transmitting region provided on the information layer of the information carrier, it is possible to calculate the surface stray light component accurately.

Furthermore, in the optical disk apparatus described above, desirably, the first light receiving unit has a plurality of divided light receiving regions similarly to the second light receiving unit, the positional deviation determination unit further includes a positional deviation signal generation unit which generates a focusing direction positional deviation signal or a tracking direction positional deviation signal by calculating a plurality of signals from the second light receiving unit, the optical disk apparatus further comprises a calculation unit which carries out the same calculation as the positional deviation signal generation unit, on a plurality of signals from the first light receiving unit, the stray light determination unit determines the surface stray light component on the basis of a signal from the calculation unit, and the stray light correction unit corrects the signal output from the positional deviation signal generation unit on the basis of the surface stray light component determined by the stray light determination unit.

According to this composition, the first light receiving unit has a plurality of divided light receiving regions similarly to the second light receiving unit. The positional deviation signal generation unit of the positional deviation determination unit generates a focusing direction positional deviation signal or a tracking direction positional deviation signal by calculating a plurality of signals from the second light receiving unit. The calculation unit carries out similar calculation to the positional deviation signal generation unit, on the plurality of signals from the first light receiving unit. The stray light determination unit determines the surface stray light component, on the basis of the signal from the calculation unit. The stray light correction unit corrects the signal output from the positional deviation signal generation unit on the basis of the surface stray light component determined by the stray light determination unit.

Therefore, since the same calculation as the positional deviation signal generation unit is carried out by the calculation unit on the plurality of signals from the first light receiving unit, the surface stray light component is determined on the basis of the signal from the calculation unit, and the signal output from the positional deviation signal generation unit is corrected on the basis of the determined surface stray light component, then the positioning of the focal point of the light beam and the point where the information on the prescribed information layer is recorded or reproduced is controlled by using a signal that has been corrected on the basis of the stray light component, and therefore even if there is variation in the reflectivity of the information layer, or variation in the light beam irradiation power during recording or reproduction, the determination gain is kept uniform and stable focus control or tracking control can be achieved.

Moreover, in the optical disk apparatus described above, desirably, the stray light determination unit calculates the surface stray light component by inputting a signal output from the calculation unit to a prescribed function.

According to this composition, since the surface stray light component is calculated by inputting the signal output from the calculation unit into a prescribed function, then it is possible readily to calculate the surface stray light component.

Moreover, in the optical disk apparatus described above, desirably, the prescribed function is a linear function which approximates the signal output from the calculation unit to the surface stray light component.

According to this composition, the prescribed function is a linear function which approximates the signal output from the calculation unit to a surface stray light component, and therefore it is possible readily to calculate a surface stray light component by adding the prescribed offset value as well as multiplying the signal output from the calculation unit by a prescribed gain value.

Furthermore, in the optical disk apparatus described above, desirably, the optical disk apparatus further comprises: a reproduction signal quality measurement unit which measures a signal quality of a reproduction signal obtained by reproducing information recorded on the information layer; and a coefficient estimation unit which estimates a coefficient corresponding to the signal output from the calculation unit in the linear function, and the coefficient estimation unit sets, in the stray light determination unit, a plurality of candidate coefficients which are candidates for the coefficient, and calculates an optimal value of the coefficient on the basis of a combination of each of the candidate coefficients which have been set and a measurement result from the reproduction signal quality measurement unit obtained when each candidate coefficient is set.

According to this composition, the reproduction signal quality measurement unit measures the signal quality of the reproduction signal obtained by reproducing the information recorded on the information layer. The coefficient estimation unit estimates the coefficient for the signal output from the calculation unit, in the linear function. The coefficient estimation unit sets, in the stray light determination unit, a plurality of candidate coefficients which are candidates for the coefficient, and calculates an optimal value of the coefficient on the basis of a combination of each of the candidate coefficients which have been set and a measurement result from the reproduction signal quality measurement unit obtained when each candidate coefficient is set.

Therefore, even if the optical parameters which specify the surface stray light component vary from the design values, due, for instance, to variation in the components used in the optical disk apparatus, variation in the adjustment process of the optical disk apparatus, variation in the material used in the cover layer of the information carrier, and the like, since an optimal coefficient for calculating the surface stray light component is estimated by using a measurement result of the signal quality of the reproduction signal when information recorded on the information layer of the information carrier is reproduced, then it is possible to calculate the surface stray light component accurately.

The concrete embodiments or practical examples which have been described in this section relating to the embodiments of the invention are merely intended to clarify the technical details of the present invention, and the invention should not be interpreted narrowly as being restricted to these concrete examples only, but rather can be implemented with various modifications within the spirit of the invention and the scope of the claims.

Industrial Applicability

The optical disk apparatus relating to the present invention is an optical disk apparatus which records or reproduces information to and from an optical disk having a cover layer using a SIL with a numerical aperture exceeding 1 in particular, and since the focus error signal or the tracking error signal are normalized correctly using a signal in which stray light has been corrected, and focus control or tracking control are carried out using the normalized focus error signal or tracking error signal, then the optical disk apparatus has stable focusing characteristics or tracking characteristics and is useful in a large-capacity optical disk recorder or computer memory apparatus, or the like.

The invention claimed is:

1. An optical disk apparatus, comprising:
a light source which emits a light beam;
a solid immersion lens which is arranged in a vicinity of a surface of an information carrier, which generates near-field light from the light beam emitted from the light source, and which condenses the generated near-field light onto the information carrier;
a focusing unit which focuses the light beam on a prescribed information layer of the information carrier;
a first light receiving unit which receives reflected light that has been reflected by an emission end face of the solid immersion lens;
a gap control unit which controls a distance between the solid immersion lens and the surface of the information carrier, based on a signal output from the first light receiving unit;
a second light receiving unit which receives reflected light from the prescribed information layer of the information carrier, in a plurality of divided light receiving regions;
a positional deviation determination unit which determines a positional deviation between a focal point of the light beam and a point where information on the prescribed information layer is recorded or reproduced, based on a signal output from the second light receiving unit; and
a stray light determination unit which determines a surface stray light component which is reflected light from the surface of the information carrier and which is included in a signal generated by the positional deviation determination unit, based on the signal output from the first light receiving unit,
wherein the positional deviation determination unit includes a stray light correction unit which corrects the signal generated by the positional deviation determination unit, the stray light correction unit correcting the signal based on the surface stray light component determined by the stray light determination unit.

2. The optical disk apparatus according to claim 1,
wherein the positional deviation determination unit further includes: an addition unit which adds up a plurality of signals output from the second light receiving unit; a positional deviation signal generation unit which generates a focusing direction positional deviation signal or a tracking direction positional deviation signal by performing a calculation on the plurality of signals output from the second light receiving unit; and a normalization unit which generates a normalized signal by dividing the focusing direction positional deviation signal or the tracking direction positional deviation signal output from the positional deviation signal generation unit, by a signal output from the stray light correction unit, and
wherein the stray light correction unit corrects a signal output from the addition unit based on the surface stray light component determined by the stray light determination unit, and outputs the corrected signal to the normalization unit.

3. The optical disk apparatus according to claim 1, wherein the stray light determination unit calculates the surface stray light component by inputting a signal output from the first light receiving unit to a prescribed function.

4. The optical disk apparatus according to claim 3, wherein the prescribed function is a linear function which approximates the signal output from the first light receiving unit to the surface stray light component.

5. The optical disk apparatus according to claim 3,
wherein the prescribed information layer of the information carrier has a transmitting region which does not reflect a light beam irradiated onto the information layer,
wherein the optical disk apparatus further comprises a function estimation unit which estimates the prescribed function, and
wherein the function estimation unit sets a plurality of gap levels which are control targets for the gap control unit and estimates the prescribed function based on each of the gap levels which have been set and a level of the signal output from the addition unit and obtained when the light beam irradiated onto the information layer passes through the transmitting region at a time of setting each gap level.

6. The optical disk apparatus according to claim 1,
wherein the first light receiving unit has a plurality of divided light receiving regions similarly to the second light receiving unit,
wherein the positional deviation determination unit further includes a positional deviation signal generation unit which generates a focusing direction positional deviation signal or a tracking direction positional deviation signal by performing a calculation on a plurality of signals output from the second light receiving unit,
wherein the optical disk apparatus further comprises a calculation unit which carries out a same calculation as the positional deviation signal generation unit, on a plurality of signals output from the first light receiving unit,
wherein the stray light determination unit determines the surface stray light component based on a signal output from the calculation unit, and
wherein the stray light correction unit corrects a signal output from the positional deviation signal generation unit based on the surface stray light component determined by the stray light determination unit.

7. The optical disk apparatus according to claim 6, wherein the stray light determination unit calculates the surface stray light component by inputting a signal output from the calculation unit to a prescribed function.

8. The optical disk apparatus according to claim 7, wherein the prescribed function is a linear function which approximates the signal output from the calculation unit to the surface stray light component.

9. The optical disk apparatus according to claim 8, further comprising:
a reproduction signal quality measurement unit which measures a signal quality of a reproduction signal obtained by reproducing information recorded on the prescribed information layer; and a coefficient estimation unit which estimates a coefficient corresponding to the signal output from the calculation unit in the linear function, wherein the coefficient estimation unit sets, in the stray light determination unit, a plurality of candidate coefficients which are candidates for the coefficient, and calculates an optimal value of the coefficient based on a combination of each of the candidate coefficients which have been set and a measurement result from the reproduction signal quality measurement unit obtained when each candidate coefficient is set.

* * * * *